US008013298B2

(12) United States Patent
Khursheed

(10) Patent No.: US 8,013,298 B2
(45) Date of Patent: Sep. 6, 2011

(54) ELECTROSTATIC ELECTRON SPECTROMETRY APPARATUS

(75) Inventor: Anjam Khursheed, Singapore (SG)

(73) Assignee: National University of Singapore (SG)

( * ) Notice: Subject to any disclaimer, the term of this patent is extended or adjusted under 35 U.S.C. 154(b) by 168 days.

(21) Appl. No.: 12/502,707

(22) Filed: Jul. 14, 2009

(65) Prior Publication Data

US 2010/0127168 A1 May 27, 2010

Related U.S. Application Data

(60) Provisional application No. 61/080,345, filed on Jul. 14, 2008.

(51) Int. Cl.
*H01J 47/00* (2006.01)
*G01N 23/00* (2006.01)

(52) U.S. Cl. ......................... 250/305; 250/306; 250/311

(58) Field of Classification Search .......... 250/305–307, 250/310–311, 396 R–397
See application file for complete search history.

(56) References Cited

U.S. PATENT DOCUMENTS

| | | | | | |
|---|---|---|---|---|---|
| 4,810,880 | A * | 3/1989 | Gerlach | ........................ | 250/305 |
| 5,032,723 | A * | 7/1991 | Kono | ............................ | 250/305 |
| 6,097,028 | A * | 8/2000 | Tsuno | ........................... | 250/305 |
| 6,150,657 | A * | 11/2000 | Kimoto et al. | ................ | 250/305 |
| 2008/0290273 | A1* | 11/2008 | Uhlemann | .................... | 250/305 |

OTHER PUBLICATIONS

C. Miron et. al., "New High Luminosity "Double Toroidal" Electron Spectrometer", Rev. Sci. Instrum, 68(10):3728-3737 (1997).*

R.W. van Boeyen, et al, "Multidetection (e,2e) Electron Spectrometer", Rev. Sci. Instrum, 76:063303-1 (2005).*

E.I. Rau et. al. "Improvements to the Design of an Electrostatic Toroidal Backscattered Electron Spectrometer for the Scattering Electron Microscope", Rev. Sci. Instrum, 73(1):227-229 (2002).*

C. Miron et al., "New high luminosity "double toroidal" electron spectrometer", *Rev. Sci. Instrum.*, 68(10):3728-3737 (1997).

R.W. van Boeyen et al., "Multidetection (e,2e) electron spectrometer", *Rev. Sci. Instrum.*, 76:063303-1 (2005).

E.I. Rau et al., "Improvements to the design of an electrostatic toroidal backscattered electron spectrometer for the scanning electron microscope", *Rev. Sci. Instrum.*, 73(1):227-229 (2002).

* cited by examiner

*Primary Examiner* — Robert Kim
*Assistant Examiner* — David Smith
(74) *Attorney, Agent, or Firm* — Ostrolenk Faber LLP

(57) ABSTRACT

An apparatus for spectrometry that includes a spectrometer configured for second order focusing and capable of 2π azimuthal collection.

21 Claims, 26 Drawing Sheets

Fig. 2: Equipotential lines from a numerically solved field distribution for the spectrometer. 16 potential intervals are taken between -1 V to +1 V.

ELECTROSTATIC ELECTRON SPECTROMETRY APPARATUS

CROSS-REFERENCE TO RELATED APPLICATION

This application is based on and claims benefit of U.S. Provisional Application Ser. No. 61/080,345, filed on Jul. 14, 2008, entitled A SECOND-ORDER FOCUSING TOROIDAL ELECTRON ENERGY SPECTROMETER, to which a claim of priority is hereby made and the disclosure of which is incorporated by reference.

BACKGROUND AND SUMMARY OF THE INVENTION

The present invention relates to spectrometry and more particularly to an electrostatic electron spectrometry apparatus that includes a toroidal spectrometer configured for second order focusing at a detector plane. Toroidal electron energy spectrometers have been used for angular photoemission studies, electron scattering experiments, and the capture of the backscattered electron (BSE) spectrum in the Scanning Electron Microscope (SEM). Toroidal Spectrometers have the desirable feature of possessing rotational symmetry, and are naturally able to collect electrons in the full 2π azimuthal direction. However, their focusing properties are usually based upon first-order optics, which makes their attainable energy resolution (for a given entrance angular spread) inferior to other types of 2π radian collection spectrometers such as the Cylindrical Mirror Analyzer (CMA), commonly used in Scanning Auger Microscopy (SAM).

At its second-order focusing condition (only possible at an entry angle of 42.3°), the CMA energy resolution has a cubic dependence on input angular spread, approximately 1.38 $\Delta\theta^3$ for acceptance angles between ±6°, indicating that its energy resolution is limited by $3^{rd}$ order spherical aberration. This gives an average theoretical relative energy resolution (100' ΔE/E) of around 0.155%. Assuming a cosine distribution with respect to the polar angle θ (measured relative to the z-axis) and 2π radian emission in the azimuthal angular direction, the total theoretical transmission is proportional to sin(2θ), around 20% for ±6°. In practice, grids are used at the spectrometer entrance and exit which typically lower the transmission to around 14%. In contrast, toroidal spectrometers (non-retarded) have a theoretical energy resolution of around 0.25% at ±3° acceptance angles (around 10% transmission). This value has been predicted by simulation for both a toroidal spectrometer in photoemission applications, and a toroidal backscattered electron spectrometer for the SEM. The energy resolution of 0.25% at ±3° acceptance angles is also comparable to the one usually quoted for the Concentric Hemispherical Analyser (CHA) on its Gaussian focal plane, given by $\Delta\theta^2$.

There are of course other advantages of toroidal spectrometers that make up for inferior energy resolution caused by first-order focusing. A toroidal spectrometer, much like a Concentric Hemispherical Analyser (CHA), can be biased to lower the kinetic energy of electrons that pass through it, thereby improving its relative energy resolution. Also like hemispherical spectrometers, toroidal spectrometers can simultaneously record different emission energies, capturing a parallel energy window of up to 15% (±7%) of the pass energy. These things are not easy to achieve with the CMA. In practice, some other constraints make the CMA difficult to use for many applications, such as its sensitivity to specimen placement.

A spectrometry apparatus according to the present invention includes a fully 2π radian collection second-order focusing toroidal spectrometer, which is based upon obtaining an intermediate focus in the r-z plane. This allows for second-order spherical aberration contributions accumulated before and after the intermediate focus to cancel, since electrons with emission angles to either side of the central ray gain spherical aberration are of opposite sign. The inventors have investigated a range of different geometrical designs, the best of which have the following simulated predictions: second-order focusing with an expected energy resolution of 0.146% for acceptance angles between ±6°, comparable to the theoretically best resolution-transmittance of the CMA; parallel energy acquisition where the increase in energy resolution with respect to the band centre rises by less than a factor of 2 for energies that lie within ±4% of the pass energy; a maximum input angular spread of ±10° and a maximum parallel energy band width of ±15% (30% total) of the pass energy; retarding/accelerating field mode of operation without the need to incorporate auxiliary lenses; and depending on the precise application, no working distance limitations.

For parallel energy detection, the detection plane can be positioned on the surface of a shallow cone whose slanting side makes an angle of around 26.4° with respect to the horizontal. A multi-channel array of flat strip detectors in the azimuthal direction is not expected to significantly degrade the energy resolution, typically less than 5% for 40 such detectors. For low energy electrons, typically less than 50 eV, electrons can be mirrored on to a flat plate detector located below the specimen after they pass through the spectrometer. The energy resolution is only marginally degraded by doing this, predicted to be 0.196% at the centre pass band energy (for an input angular spread of ±6°).

To simulate the performance of a spectrometer according to the present invention, finite element programs were used to solve for two-dimensional rotationally symmetric electrostatic field distributions on a polar mesh. Numerical ray tracing of electrons through these field distributions were then plot using bi-cubic interpolation and the $4^{th}$-order Runge-Kutta method. The meshes were graded so that smaller mesh cells were used within the centre region between the deflection plates. The size of each adjoining mesh cell was increased by 10% in the radial direction, and mesh cells mid-way between the plates were selected to be typically 276 smaller than those at electrode boundaries. The base mesh resolution for each field solution used 145 by 145 mesh lines. All programs were written by the author and are part of the KEOS package, which are reported in detail in A. Khusheed, The Finite Element Method in Charged Particle Optics, (Kluwer Academic Press, Boston, USA, 1999). The accuracy of the simulation was continually checked by repeating all results with finer numerical meshes and smaller trajectory step sizes, ensuring that the final simulated parameters such as rms trace width did not change significantly (by less than 1%).

At present, the detection systems of the Scanning Electron Microscope (SEM), Scanning Helium Ion Microscope (SHIM) or Focused Ion Beam (FIB) are not generally designed to capture the energy spectrum of the ions/electrons scattered from the sample. Their output signals are formed by secondary electrons and backscattered electrons/ions, which are usually detected separately. However, the energy spectra of these scattered particles contain valuable information about the sample under study. The shape of the emitted secondary electron spectrum is related to the sample's work function, which is very useful for applications such as PN junction doping concentration mapping. The backscattered ion/electron spectrum changes significantly with atomic number. Combining this kind of information with a scanning ion/electron microscope's normal imaging mode of operation, would obviously make it a much more powerful analytical tool for nano-scale inspection. BSE spectral results disclosed herein demonstrate that a second-order focusing toroidal spectrometer according to the present invention can be used to enable a conventional SEM to acquire quantitative BSE material contrast information.

Further simulations have shown that an accelerating pre-focusing lens improves the energy resolution for a given entrance angular spread by an order of magnitude (0.02% for ±6° entrance angular spread).

In these simulations, all field distributions and electron trajectory ray paths were simulated using Lorentz-2EM, a hybrid software that combines boundary element and finite element techniques. The boundary element method avoids well-known mesh generation/interpolation problems of the finite element method, especially difficult for curved boundaries. On the other hand, the finite element method was used for non-linear field solutions, such as those that arise in the presence of magnetic saturation, which are difficult to solve directly by boundary element methods. Both numerical techniques were coupled together, utilizing their relative strengths. In addition, an adaptive segment technique varied the density of charge segments on conductor surfaces, refining it according to local field strength. The subsequent improvement on field accuracy and shortening of trajectory run times for a given number of charge segments, allowed for modeling of problems of greater complexity. The software was able, for instance, to simulate electrostatic structures that are very small, and embedded in much larger conductor layouts. In the present context, this feature was used to plot accurate direct trajectory paths through an aperture slit, microns in size, placed within the fringe fields of a spectrometer measuring many centimeters. The use of a $5^{th}$ order Runge-Kutta method in which the trajectory step-size varies according to local truncation error also helped in making this kind of problem much easier to simulate. The accuracy of all simulations were continually checked by repeating all results with smaller boundary segments and trajectory step sizes, ensuring that important ray tracing parameters, such as the rms value for the final focal point size at the spectrometer exit did not change significantly (by less than 1%).

To summarize, a toroidal electron energy spectrometer according to the present invention captures electrons in the full 2π azimuthal angular direction while at the same time having second-order focusing optics. Simulation results based upon direct ray tracing predict that the relative energy resolution of a spectrometer according to the present invention will be 0.146% and 0.0188% at input angular spreads of ±6° and ±3° respectively, which is comparable to the theoretically best resolution of the Cylindrical Mirror Analyzer (CMA), and an order of magnitude better than existing toroidal spectrometers. Also predicted for the spectrometer is a parallel energy acquisition mode of operation, where the energy bandwidth is expected to be greater than ±10% (20% total) of the pass energy. A spectrometer according to the present invention can allow for retardation of the pass energy without the need to incorporate auxiliary lenses.

A spectrometer according to the present invention combined with a pre-focusing electrostatic lens, is predicted to have a relative energy resolution of 0.02% and 0.088% for emission angular spreads of ±6° and ±10° respectively, corresponding to a transmittance of around 20% and 34%.

Other features and advantages of the present invention will become apparent from the following description of the invention which refers to the accompanying drawings.

DETAILED DESCRIPTION OF THE EMBODIMENTS

Figure 1A:
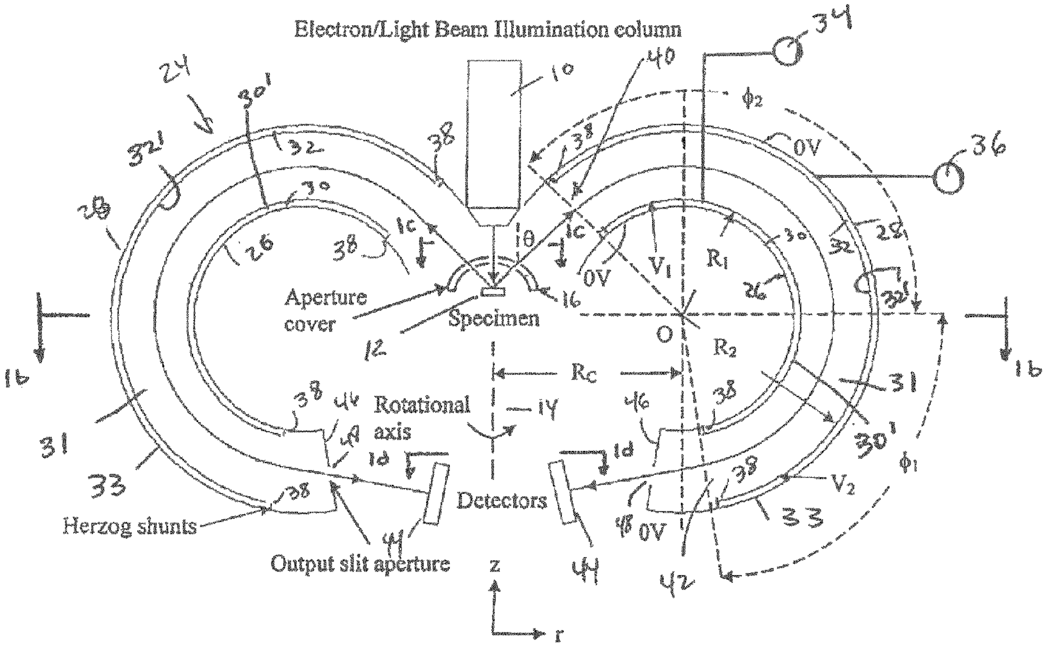
FIG. 1*a* schematically shows the layout of a 2π radian collection second-order focusing toroidal spectrometer design according to one embodiment of the present invention.
Figure 1B:
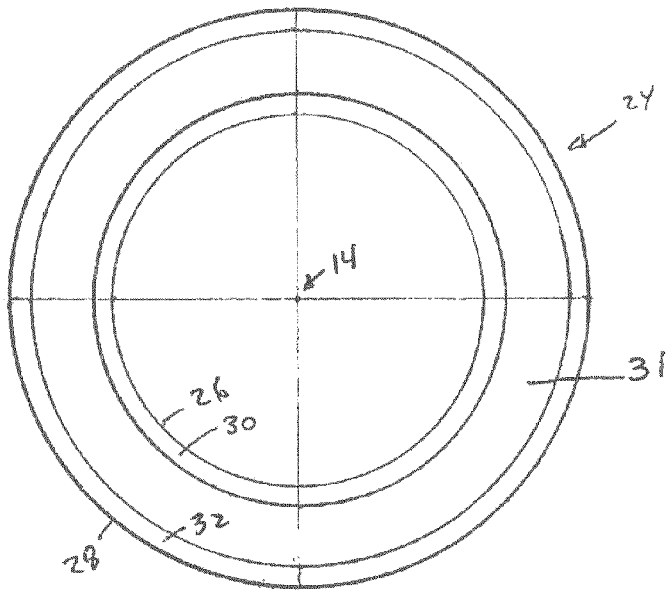
FIG. 1*b* shows a cross-sectional view along line 1*b*-1*b* viewed in the direction of the arrows.
Figure 1D:
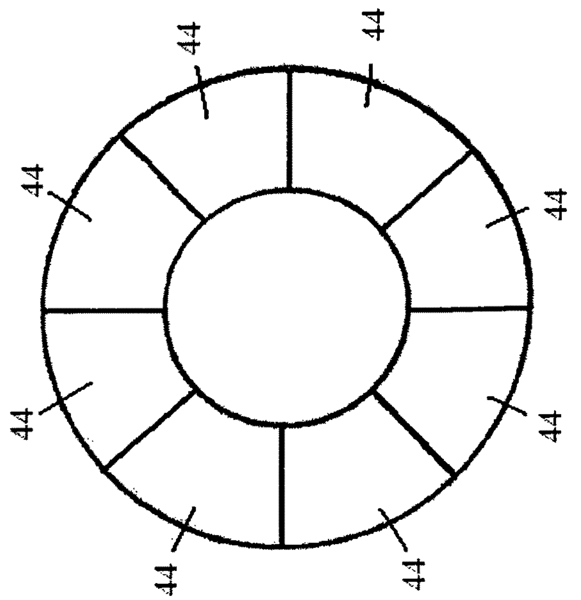
FIG. 1*d* shows a plan view in the direction of the arrows.
Figure 1C:
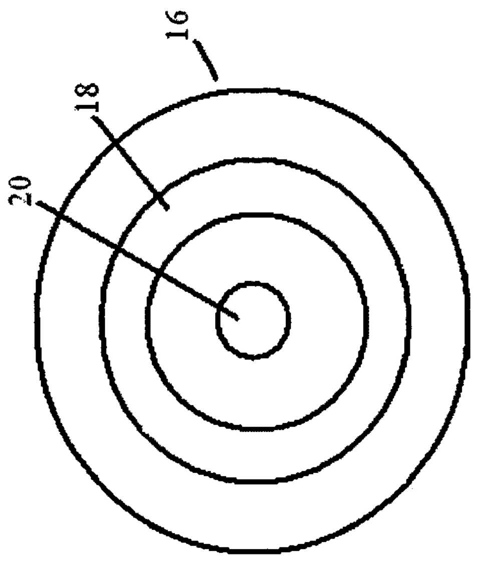
FIG. 1*c* shows a plan view in the direction of the arrows.
Figure 1E:
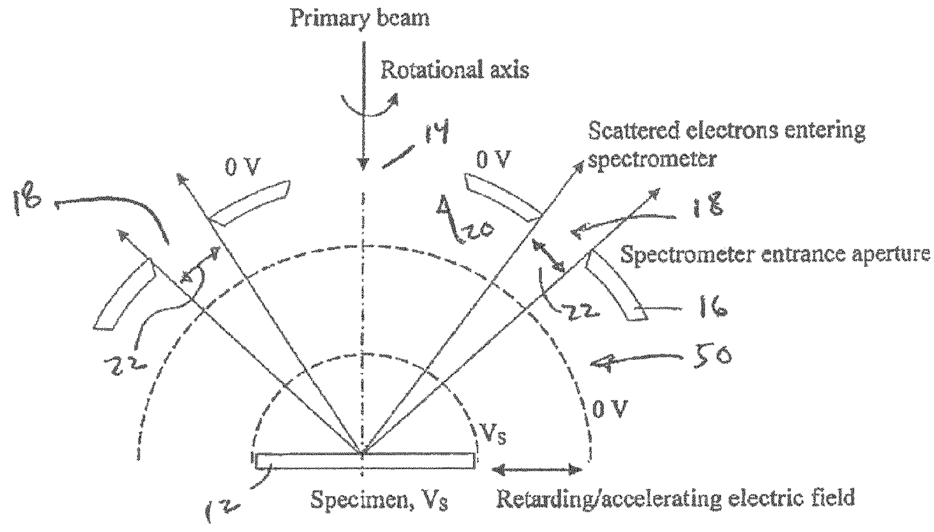
FIG. 1*e* illustrates two hemispherical grids above a specimen.

Referring to FIGS. 1*a*-1*d*, an electron spectrometry apparatus according to the present invention includes an emitter 10 which emits particles such as electrons or photons. Emitter 10 is arranged to bombard the surface of a specimen 12 with particles in order to generate a population of scattered electrons. The specimen may be a piece of semiconductor material, a metallic body, an organic sample or the like. Specimen 12 is preferably positioned on a platform, which is rotated about a rotation axis 14 in a clockwise or a counter-clockwise direction. Preferably, the beam of particles emitted from emitter 10 travel in a direction that is generally aligned with rotation axis 14. As is well known, the bombardment of specimen 12 causes the generation of scattered electrons from specimen 12 which travel in all directions. In order to select the direction of scattered electrons a cover 16 is placed over specimen 12. Specifically, cover 16 includes an annular slit 18 the width of which is selected to allow the passage of scattered electrons only along certain directions. The remainder of the scattered electrons are blocked by the interior surface of cover 16. Note that cover 16 further includes a centrally located orifice 20 through which particles emitted from emitter 10 travel to reach specimen 12. FIG. 1*e* illustrates a particle beam that travels through orifice 20 to strike the surface of specimen 12 to cause the generation of scattered electrons that pass through annular orifice 18, whereby annular orifice 18 effectively defines the angular spread 22 of the scattered electrons passing through cover 16. Note that scattered electrons traveling along a trajectory that resides at the center of angular spread 22 is angularly spaced from the vertical at an angle θ (see FIG. 1*a*).

In a spectrometry apparatus according to the present invention rotation axis 14 coincides with the central axis of a toroidal spectrometer 24. Toroidal spectrometer 24 includes an inner semi-toroidal surface 26 and an outer semi-toroidal surface 28. A semi-toroidal surface as used herein refers to a body that is an incomplete toroid. Each semi-toroidal surface 26, 28 is a curved surface having a semi-circular cross-section that traverses, at a right angle, a circle that includes a central axis coinciding with rotation axis 14 and a radius $R_c$. Note that semi-circular cross-sections of semi-toroidal surfaces 26, 28 have a common center of curvature O. Each center of curvature O coincides with a point on the circle having a central axis that coincides with rotational axis 14.

In a spectrometer 24 according to the first embodiment, a first deflection plate 30 is disposed on inner semi-toroidal surface 26 and follows the contour thereof. Furthermore, a second deflection plate 32 is disposed on outer semi-toroid surface 28 and follows the contour thereof. Consequently, first deflection plate 30 includes a convex outer surface 30' which faces a concave outer surface 32' of second deflection plate 32. Thus, a semi-toroidal space 31 is defined between the convex outer surface 30' of the first deflection plate 30 and of the concave outer surface 32' of second deflection plate 32 through which scattered electrons may travel. Note that convex outer surface 30' of first deflection plate 30 includes a radius of curvature $R_1$ which passes through center of curvature O and the concave outer surface 32' of second deflection plate 32 includes a radius of curvature $R_2$, which also passes through center of curvature O. $\phi_1$ and $\phi_2$ define the length of first deflection plate 30 and second deflection plate 32 respectively.

In operation, a first voltage source 34 that is electrically coupled to first deflection plate 30 biases the same to a first voltage $V_1$, and a second voltage source 36 that is electrically coupled to second deflection plate 32 biases the same to a second voltage $V_2$. As a result, an electric field is generated inside the semi-toroidal space between first deflection plate 30 and second deflection plate 32. Herzog shunts 38 may be deployed at respective ends of deflection plates 30, 32 to attenuate fringe fields. Cover 16 is arranged such that scattered electrons traveling along a trajectory at the center of angular spread 22 (i.e. a trajectory that is angularly spaced from the rotation axis by angle θ) enter spectrometer 24 at the electron entrance end 40 thereof at or near the center of semi-toroidal space 31. Of course, other electrons traveling along a trajectory inside angular spread 22 also enter spectrometer 24 through the electron entrance end 40 thereof. Electrons then exit through the electron exit end 42 of spectrometer 24 and are detected by detectors 44 which, in the first embodiment, may be disposed on a conical surface. Note that a filter 46 having an output slit aperture 48 may be disposed between electron exit end 42 and detectors 44. Further note that in the preferred embodiment, while deflection plates 30, 32 are biased, the exterior surfaces of spectrometer 24 are at zero potential because of shielding body 33.

Referring now to FIG. 1*e*, two hemispherical grids can be placed above specimen 12 which might be biased with two potentials. Scattered electrons from specimen 12 may be accelerated or decelerated by the application of an electric field around specimen 12 between specimen 12 and annular aperture 18. The acceleration and deceleration of scattered electrons can be employed to obtain various effects.

Figure 1F:
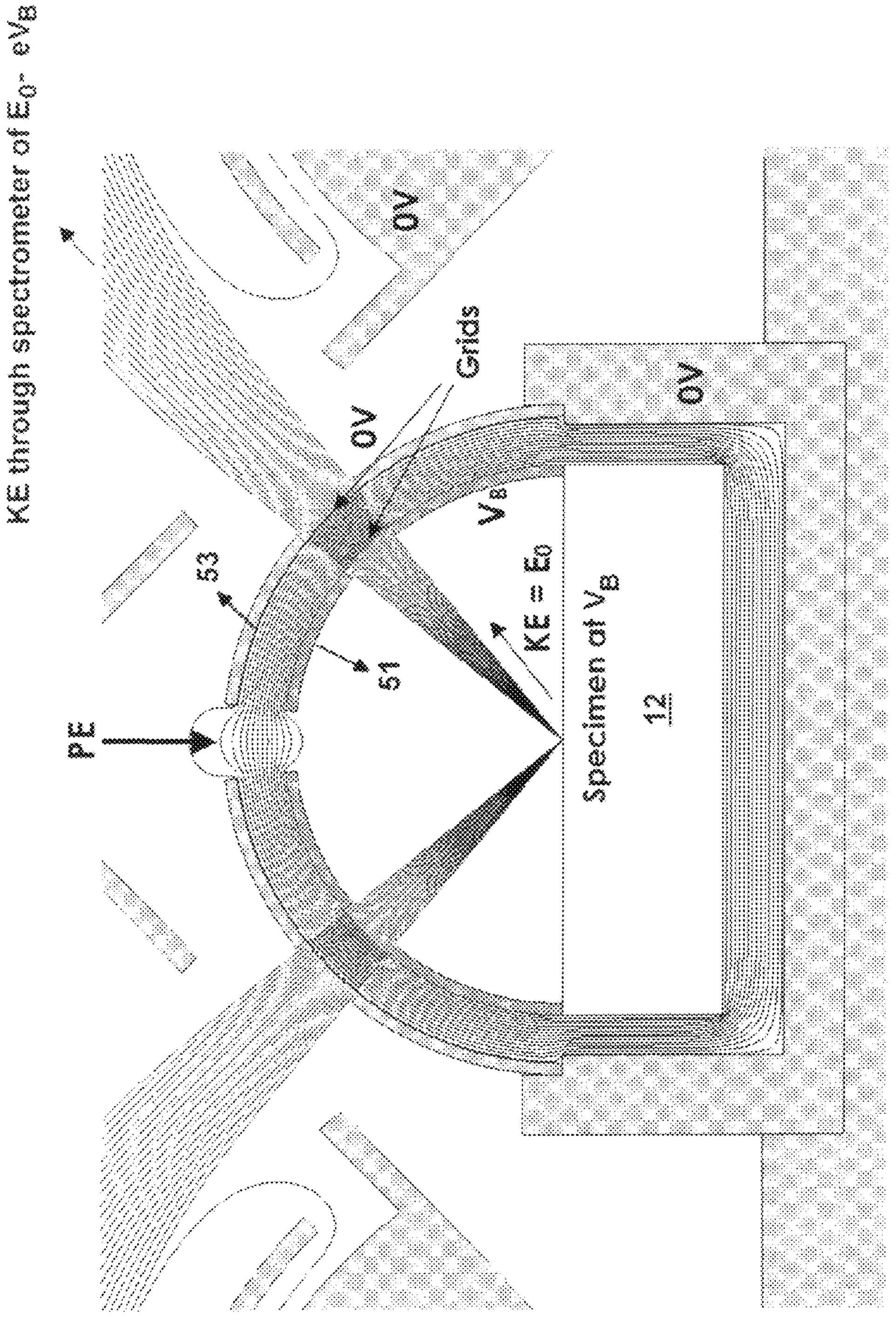
FIG. 1*f* illustrates a spectrometer according to the present invention using the retarding field concept to improve energy resolution.

Referring to FIG. 1*f*, a spectrometer according to the present invention can use the retarding field concept to improve the energy resolution. For example, the specimen and a hemispherical electrode 51 (in which a grid may be placed) surrounding specimen 12 can be biased to a voltage $V_B$. The Kinetic Energy (KE) of scattered electrons inside the inner hemisphere 51 is equal to the energy with which they leave specimen 12 $E_0$, since the region inside hemisphere 51 is a field-free region (all at $V_B$). The scattered electrons travel through the first grid and are then slowed down to a potential of 0 volt on the outer grid 53, whereby their Kinetic Energy becomes $E_0$-e$V_B$, where e is the electronic charge of an electron. Electrons are, therefore, slowed down as they pass through the spectrometer, improving the energy resolution. If for instance, specimen 12 and inner hemispherical electrode 51 ($V_B$) are at 990 volts, and the emission energy ($E_0$) is 1000 eV, the pass kinetic energy through the spectrometer is 10 eV, whereby the kinetic energy of electrons through the spectrometer is retarded.

Electrons that pass through the spectrometer, can either be filtered by an output annular slit aperture before being collected by a 2π collection detector (or an array of detectors distributed in the azimthual direction), or they can pass through a zero volt grid and strike an array of multi-channel plate detectors for parallel energy acquisition, where the detection plane is defined on a shallow cone surface.

Figure 1G:
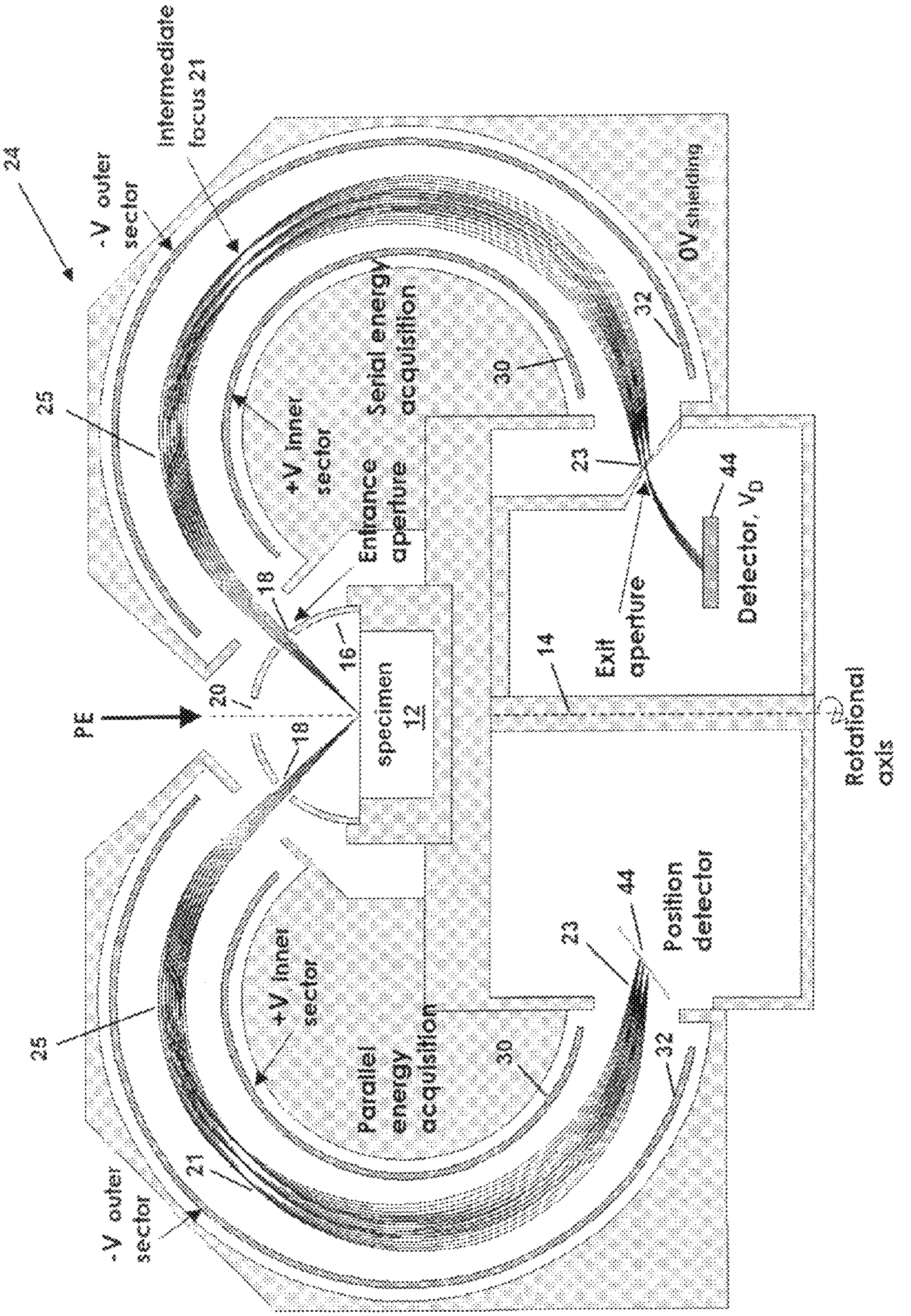
FIG. 1*g* illustrates a cross-section of a variation of a toroidal energy spectrometer according to the present invention.

FIG. 1*g* shows a cross section of a variation of a toroidal electron energy spectrometer according to the present invention. Referring to FIG. 1*g*, the right-hand half of the spectrometer is designed for normal serial acquisition energy spectrometer with an aperture placed at its exit to select single electron energy, while the left-hand half is designed for parallel energy acquisition with a position detector placed along the energy dispersion plane.

In FIG. 1*g*, trajectories 25 for 3 emission energies of the pass energy $E_P$ and $E_P$±5% $E_P$ with 7 input angles from −52 mrad to 52 mrad around the central ray in uniform steps are shown. For the serial energy acquisition, only the electrons having the energy of the pass energy $E_P$ can go through the exit aperture to be captured by detector 44, while all the electrons of the energy band ranging from 95% to 105% of the pass energy can be detected simultaneously in the parallel energy acquisition mode.

Figure 1H:
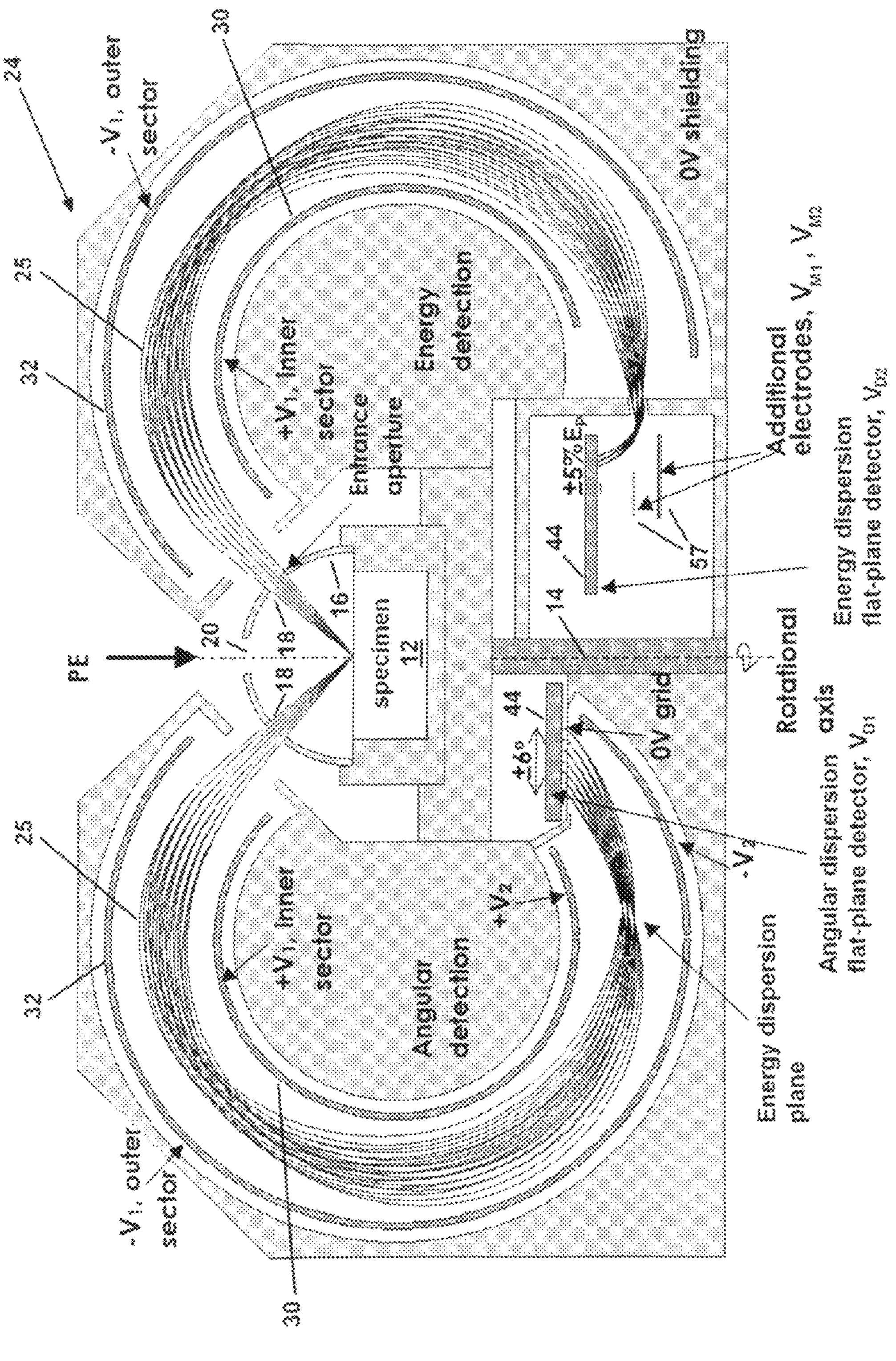
FIG. 1*h* illustrates a spectrometer according to the present invention configured for angular-energy detection.

FIG. 1*h* shows a spectrometer according to the present invention configured for angular-energy detection. Specifically, the left-hand half is for angular detection and the right-hand half is for energy detection in parallel. The potentials $\pm V_1$ are applied to the inner and outer sectors of both parts to disperse the energy of electron emission, while the potentials $\pm V_2$ are additionally applied to the extended sectors for angular dispersion in the angular detection design. Additional electrodes 57 are also added at the exit of the energy detection half to bend the electrons towards the detector 44 as well as to maintain the energy dispersion along the detector to allow for capturing energy in parallel. Flat-plane detectors are used in both cases.

As detailed below by the proper selection of values for parameters such as angular spread 22, θ, $R_1$, $R_2$, $\phi_1$, and $\phi_2$, a spectrometry apparatus according to the present invention is configured to capture scattered electrons in the 2π azimuthal angular direction (that is, in all directions around specimen 12) to obtain second order focusing of the scattered electrons, and may be operated in a parallel energy acquisition mode.

Energy Resolution Estimates

A spectrometer according to the present invention is configured for second order focusing. Set forth below are details relating to a simulation that confirms the second order focusing capability of a spectrometer according to the present invention. Referring to FIG. 1*a*, for the purpose of the simulation, it was assumed that an illuminating beam of either photons or electrons is directed and focused on to the specimen through orifice 20 in cover 16. It was then assumed that the scattered/secondary electrons travel from the specimen through annular slit 18 in cover 16, entering the spectrometer at an angle θ. The width of the annular slit 18 was used to define the input angular spread 22, ±Δθ. The polar coordinates $\phi_1$, $\phi_2$, $R_1$ and $R_2$ were used as the length and radii of the surfaces 30', 32' deflection plates 30, 32 around the centre point O in the r-z plane (which is the plane on which $R_1$ and $R_2$ lie, i.e. the radial plane of toroidal space 31), while $V_1$ and $V_2$ were selected to be +1 and −1 for the purposes of the simulation. It was also assumed that the instrument is surrounded by zero volt shielding plates 33, and Herzog shunt plates 38 smoothly attenuate fringe fields.

Figure 2:
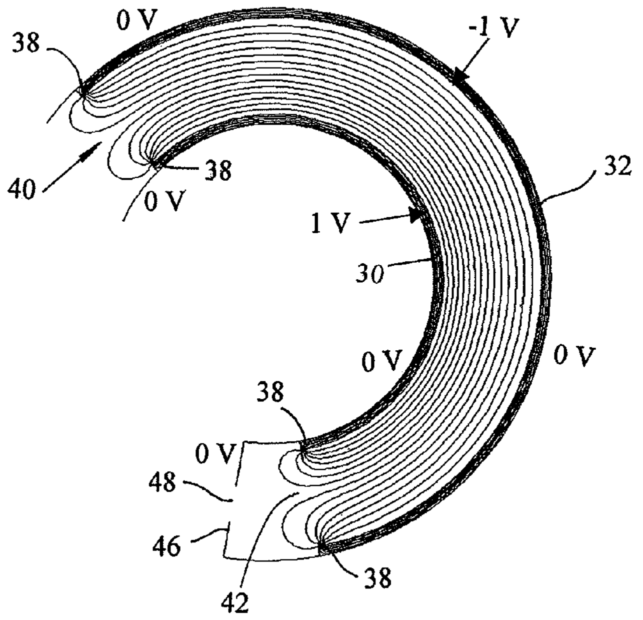
FIG. 2 shows simulated equipotential lines from a numerically solved field distribution for a spectrometer according to the present invention.

FIG. 2 depicts 16 simulated equipotential lines between −1 to +1 V in equal steps for the spectrometer design, where θ=45°, $\phi_2$=3π/4, $\phi_1$=−π/2.25, $R_1$=1.4 cm, $R_2$=2.2 cm, and $R_C$=2.2 cm. These radii are nominal, since all important optical/aberration parameters, including the pass energy, linearly scale with spectrometer dimensions. FIG. 2 shows that although fringe fields generated from the deflection plates penetrate into the electron entrance 40 and electron exit 42 of spectrometer 24, they are greatly attenuated by the Herzog shunts 38. With this electrode arrangement, variations in the precise shape of the shielding plates 33 beyond Herzog shunts 38 do not greatly affect the focal properties of spectrometer 24.

Electron trajectory paths were traced from specimen 12 into toroidal path 31 of spectrometer 24, starting with the central ray (i.e. ray traveling along the central trajectory inside angular spread 22 which is angularly spaced from vertical by angle θ) whose energy is automatically scaled so that its trajectory path is always normal to deflection plates 30, 32 on exit. This condition means that the central trajectory does not necessarily exit mid-way between the deflection plates, and indeed, there is no need to force it to do so. For the deflection plate potentials normalized to −1 V and +1 V, the pass energy for a toroidal spectrometer 24 was found to be 2.293 eV (to 3 decimal places).

Figure 3A:
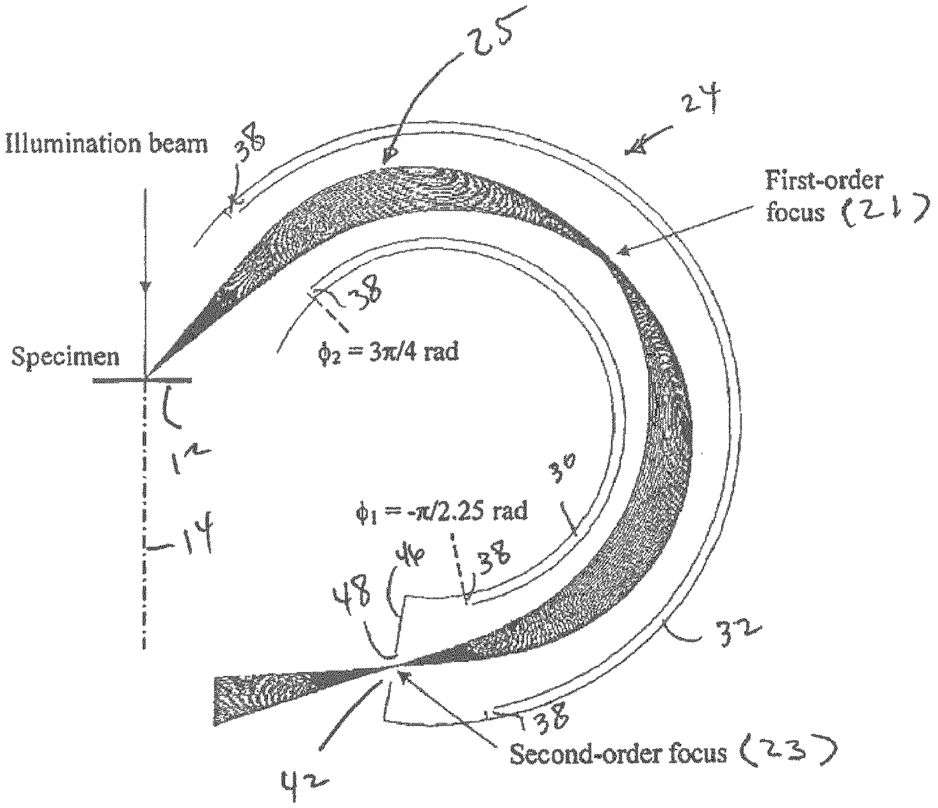
FIGS. 3*a* and 3*b* illustrate simulated ray paths of electrons through the spectrometer at a pass energy for a wide variety of entrance angles.
Figure 3B:
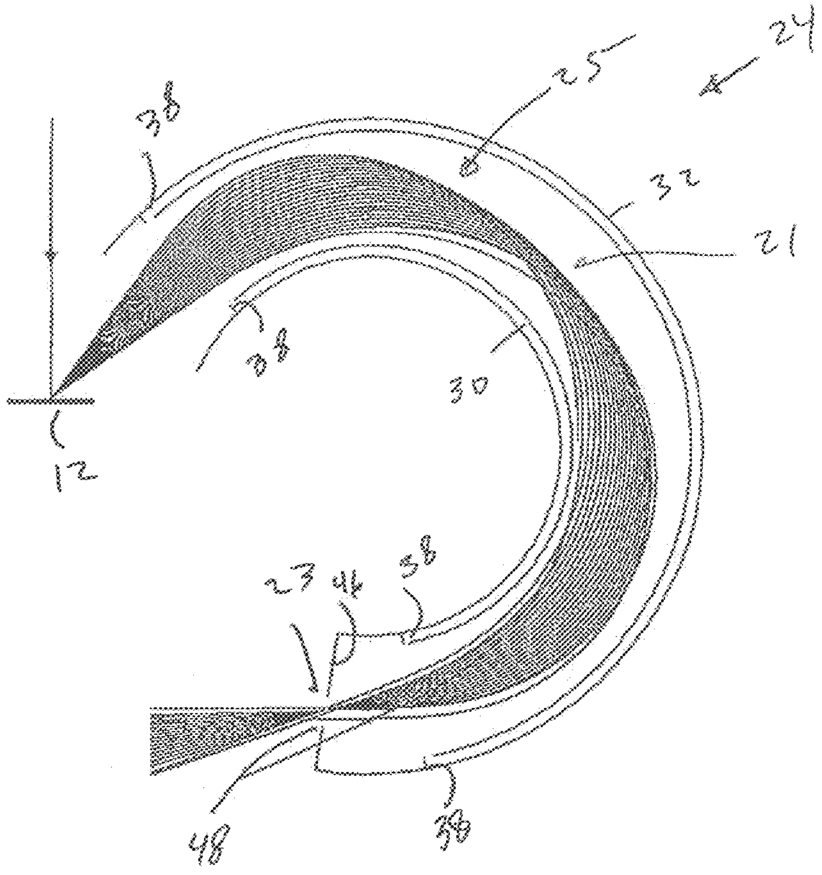

FIG. 3*a* shows twenty one uniformly angularly spaced trajectory paths 25 of scattered electrons leaving a point on the rotational axis with the pass energy (2.293 eV) for an entrance angle θ of 45° and an input angular spread 22 of ±6° (i.e. 12° total). These ray paths clearly indicate a much sharper focus 23 (second order focus) at electron exit 42 of spectrometer 24 than for the intermediate focus 21 (first order focus) which suggests that second-order focusing is taking place at electron exit 42. FIG. 3*b* shows that the spectrometer plate geometry can in principle accept an input angular spread 22 of up to ±10° (i.e. 20° total), corresponding to a transmission of around 34% for a cosine distribution of emission. The energy resolution, however, would be worse than expected since wider angle electrons now travel very close to deflection electrodes 30, 32.

Figure 4A:
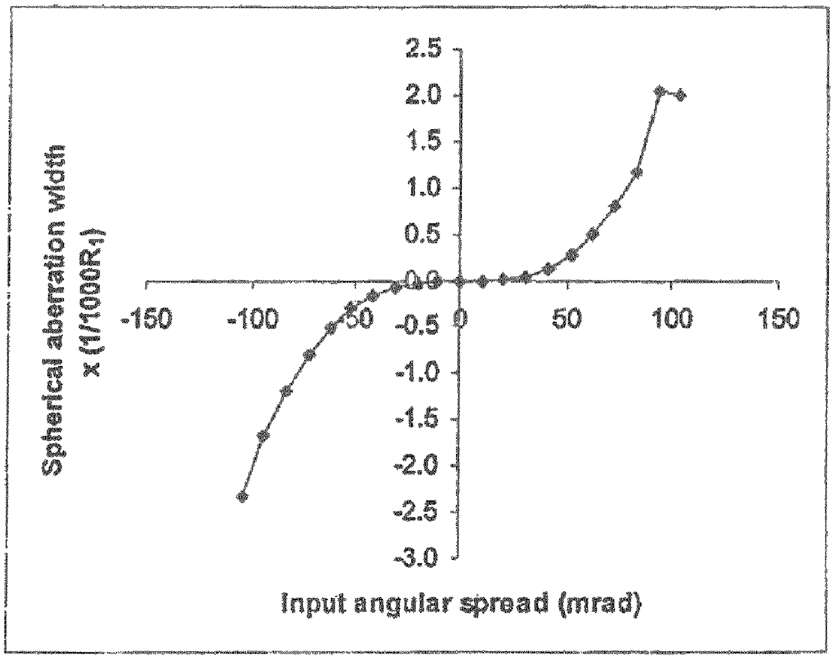
FIGS. 4*a* and 4*b* show simulated normalized trace width at the output plane (a) due to spherical aberration (FIG. 4*a*); (b) due to relative energy spread (FIG. 4*b*).
Figure 4B:
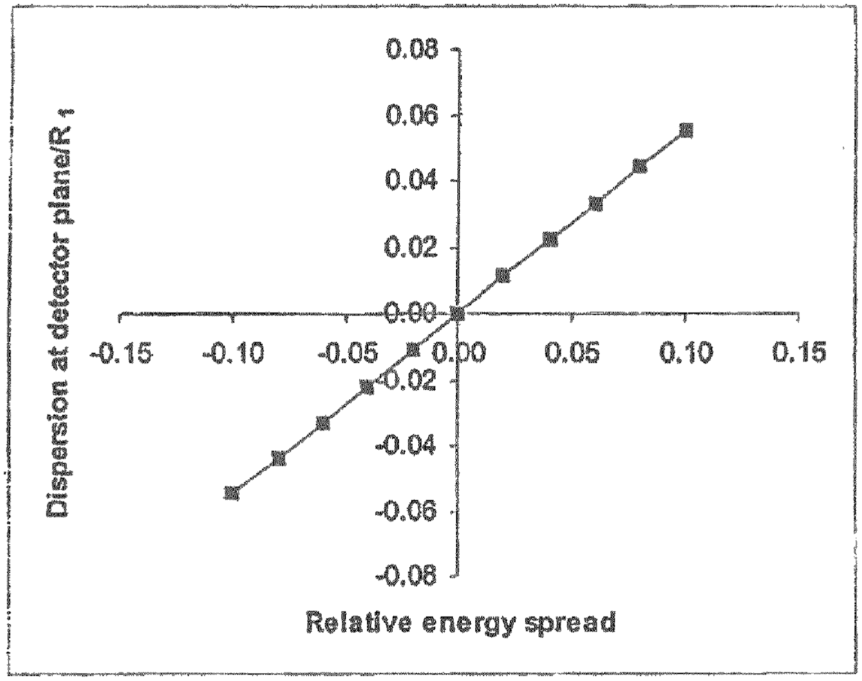

By monitoring intersection points and angles with the central ray, it is relatively straightforward to plot the beam trace width as a function of input angle at the output Gaussian focal plane, which is shown in FIG. 4*a*. This graph confirms that second-order focusing is predicted for spectrometer 24 since the trace width at the Gaussian plane clearly exhibits $3^{rd}$ order (cubic) spherical aberration dependence with respect to the input angular spread. FIG. 4*b* depicts the dependence of the trace width at the output Gaussian focal plane caused by the relative energy spread in the beam, and as expected, it takes a first-order linear variation (dispersion).

The trace width at the output focal plane, ΔW, is a combination of energy dispersion and spherical aberration, and can be approximately represented by fitting a cubic expression to FIG. 4*a* and a straight line to FIG. 4*b*, which is given by $$\Delta W = 0.553R_1\left(\frac{\Delta E}{E}\right) + 1.925R_1\Delta\theta^3$$

Proceeding with the normal method of estimating energy resolution, which assumes that the minimum energy resolution is equivalent to half the spherical aberration contribution distributed over the full input angular variation [−Δθ, +Δθ], the first term in the above equation is equated to the second term, obtaining, $$0.553R_1\left(\frac{\Delta E}{E}\right) + 1.925R_1\Delta\theta^3$$

$$\Rightarrow \left(\frac{\Delta E}{E}\right) = 3.48\theta^3$$

At 104 mrad (6°), the relative base energy resolution was predicted to be 0.392%, or 0.049% at 52 mrad (3°).

A more accurate method of calculating the relative energy resolution is simply to estimate it to be twice the value of the rms value of the graph depicted in FIG. 4*a*, which is $2.054'10^{-4}$, and divide it by the gradient of the line shown in FIG. 4*b*, 0.554, to obtain an estimated theoretical relative base energy resolution of 0.37%. The rms approach is more general and has the advantage of not depending on the precise form of spherical aberration distribution, which will inevitably contain within it, higher order terms, and residual traces of the second-order term. The rms approach is also better suited to investigating the improvement in energy resolution that can be obtained by shifting output slit plane 48 slightly away from Gaussian focal point along the central ray. It was noticed for instance that shifting output slit plane to −0.17 mm before the Gaussian focal plane resulted in the energy resolution improving by a factor of 2.53, to 0.146%. This is a well known property of $3^{rd}$ order aberration limited focusing systems, and a similar factor of improvement has been incorporated into the best theoretical energy resolution estimate already cited for the CMA. The simulated energy resolution for the present second-order focusing toroidal spectrometer is therefore comparable to the theoretically best energy resolution of the CMA.

For input angular spread 22 of ±3° (i.e. 6° total), the relative energy resolution based upon calculating the spherical aberration distribution rms value was found to be 0.0446% at the Gaussian focal plane, which at a distance of −0.04 mm along the central ray fell to 0.0188% (factor of 2.36 improvement), over an order of magnitude better than the 0.25% simulated energy resolution reported for previous first-order toroidal spectrometers. Based upon the foregoing simulated energy resolution estimates of 0.146% and 0.0188% at input angular spreads of ±6° and ±3° respectively, the best relative energy resolution of the second-order focusing toroidal spectrometer was given approximately by $1.314\ \Delta\theta^3$.

A spectrometer designed to accept a 45° central ray with respect to the vertical axis was found to provide the best predicted resolution. Due to less dispersion and a longer exit focal length, a 60° entrance angle (for a ±6° angular spread) spectrometer geometry has a predicted energy resolution that is more than two times worse. For a 30° entrance angle design, although the dispersion is greater, the $2^{nd}$ focal point lies within the main body of the spectrometer, making it difficult to place detectors at the second-order focus plane. For these reasons, a spectrometer designed to accept a 45° central ray provided the best results.

Parallel Energy Acquisition Mode

Figure 5A:
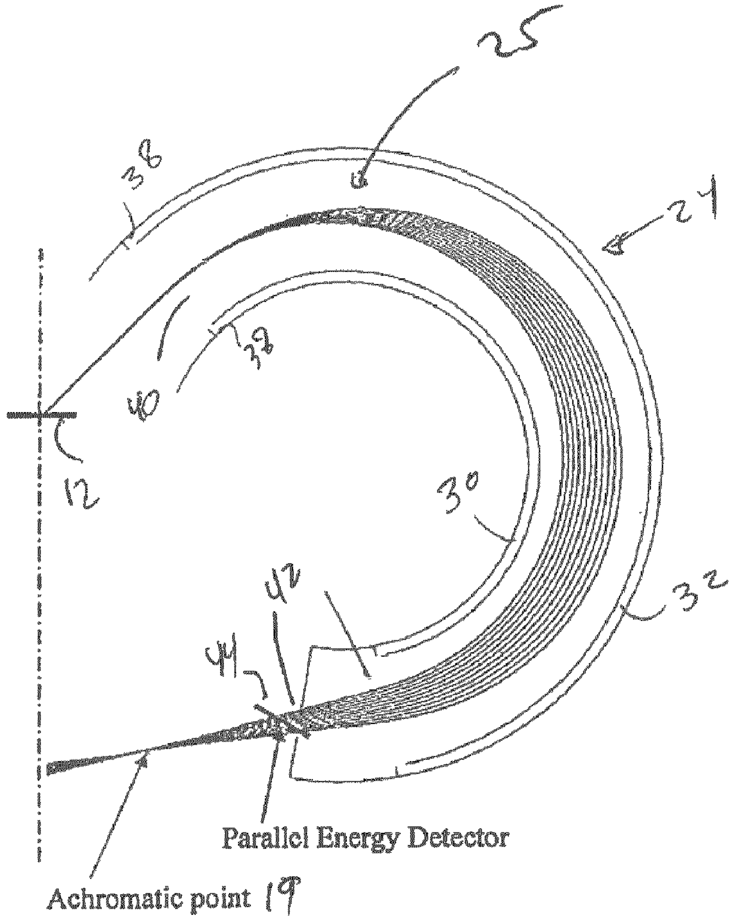
FIGS. 5*a* and 5*b* illustrate simulated parallel energy detection using a spectrometer according to the present invention for (a) 90% to 110% of the pass energy (FIG. 5*a*); and (b) 85% to 110% of the pass energy (FIG. 5*b*).
Figure 5B:
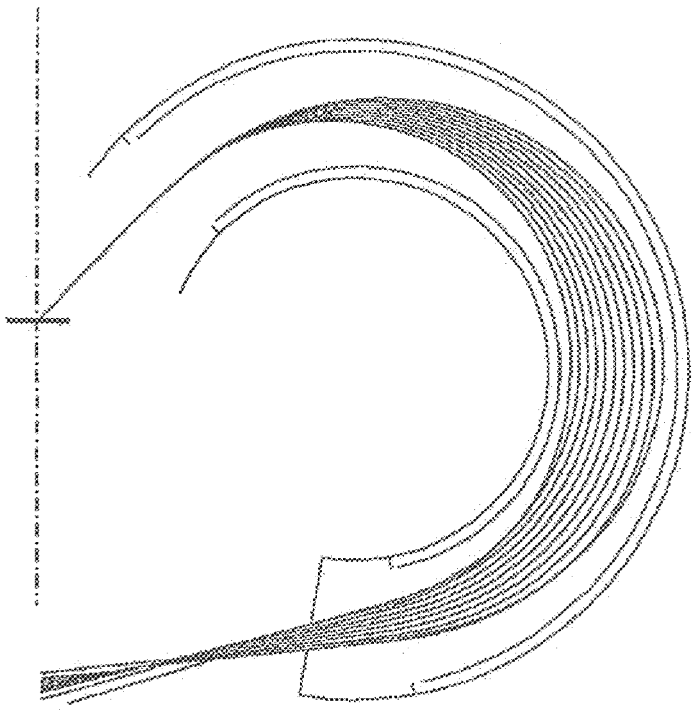

FIGS. 5*a* and 5*b* show simulated electron trajectory paths 25 leaving a point on axis with a range of different emission energies through the second-order focusing toroidal spectrometer design, with no angular dispersion considered. Eleven trajectories are plotted in uniform steps over an energy range spanning 90% to 110% of the pass energy. There is clearly considerable energy dispersion at the spectrometer output 42, where a tilted detector 44 for parallel energy acquisition is marked in the figure. Simulation results also showed that the spectrometer plate geometry can in principle provide greater energy dispersion, more than ±15% (total of 30%) of the pass energy. Although the energy resolution will naturally be much larger at the edges of such a large energy pass band range, there are situations where high transmission of this kind may be useful. In the SEM for instance, electrons close to the centre of a wide energy pass band can be used for spectroscopy, while those outside the centre region can be simultaneously used to form a topographical image of the specimen.

It is interesting to note the existence of an achromatic point 19 located further down the central ray in FIG. 5*a*. If the electric field distribution in the spectrometer had been perfectly symmetric before and after the intermediate focus 21, one would expect a reduction in chromatic aberration, leading to a substantial reduction in dispersion at the output plane, similar to the cancellation of $2^{nd}$-order spherical aberration. Fortunately, due to the asymmetric nature of the field distribution in the toroidal geometry, chromatic aberration does not cancel as much as spherical aberration, and a significant amount of dispersion at the output focal plane is predicted: a dispersion of 155 μm is expected for a relative energy spread of $2'10^{-2}$ ($R_1$=1.4 cm), compared with a trace width of 11.31 μm produced by spherical aberration with an input angular spread 22 of ±6°.

Figure 6A:
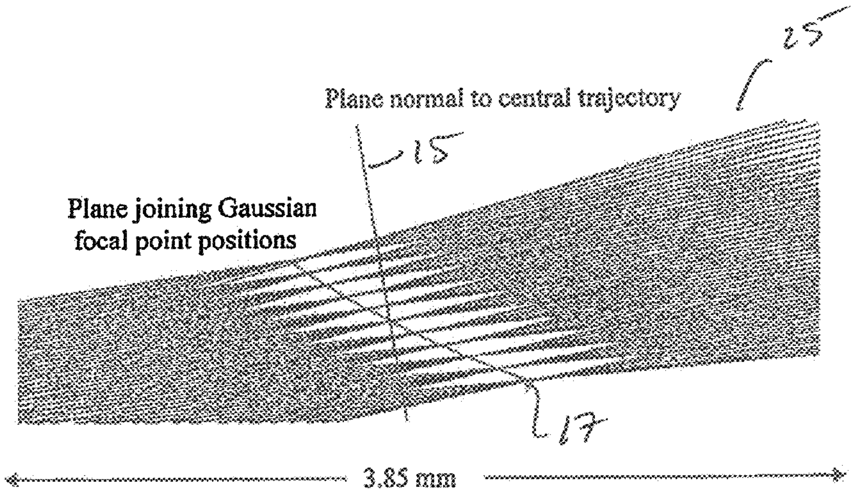
FIGS. 6*a* and 6*b* show simulated trajectories around the output focal plane for 11 emission energies ranging from 95% to 105% of the pass energy and 11 input angles from −52 mrad to 52 mrad around the central ray in uniform steps for (a) the normal plane and line joining up Gaussian focal points (FIG. 6*a*); and (b) detection plane at 26.4° with respect to the horizontal axis (FIG. 6*b*).
Figure 6B:
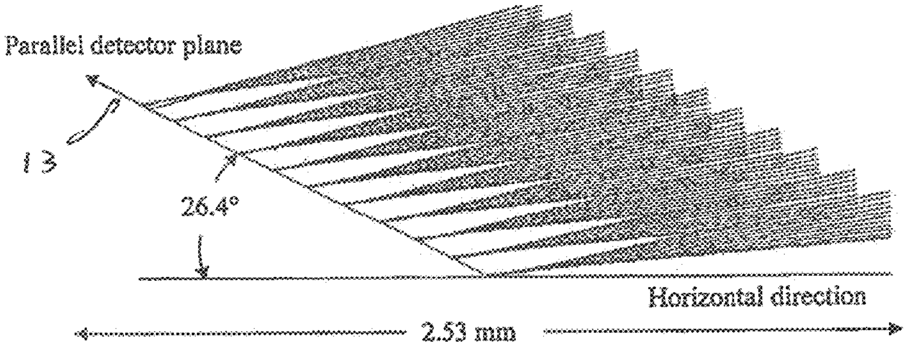

FIG. 6*a* shows a magnified set of simulated ray paths 25 around the output focal plane 17 that have different emission energies and angles. There are eleven different energies uniformly spread over the energy interval ranging from 95% to 105% of the pass energy. For each energy, there are eleven trajectories whose input angles are uniformly spread between −52 to 52 mrad around the central entrance angle (45°). Also marked on FIG. 6*a* is the plane 15 normal to the central ray Gaussian focal point, and the line joining the Gaussian focal points on each central energy ray. These results indicate that the influence of spherical aberration for parallel energy acquisition will be greatly reduced if the detection plane is aligned to the line joining Gaussian focal points at different energies, rather than be normal to the central ray. FIG. 6*b* shows the case where the detector plane 13 is orientated to be 26.4° with respect to the horizontal axis, a line that is formed by joining together the Gaussian focal points of rays at either extreme of the energy band (95% and 105% of the pass energy). All eleven rays across the energy band appear well focused along this line.

Figure 7:
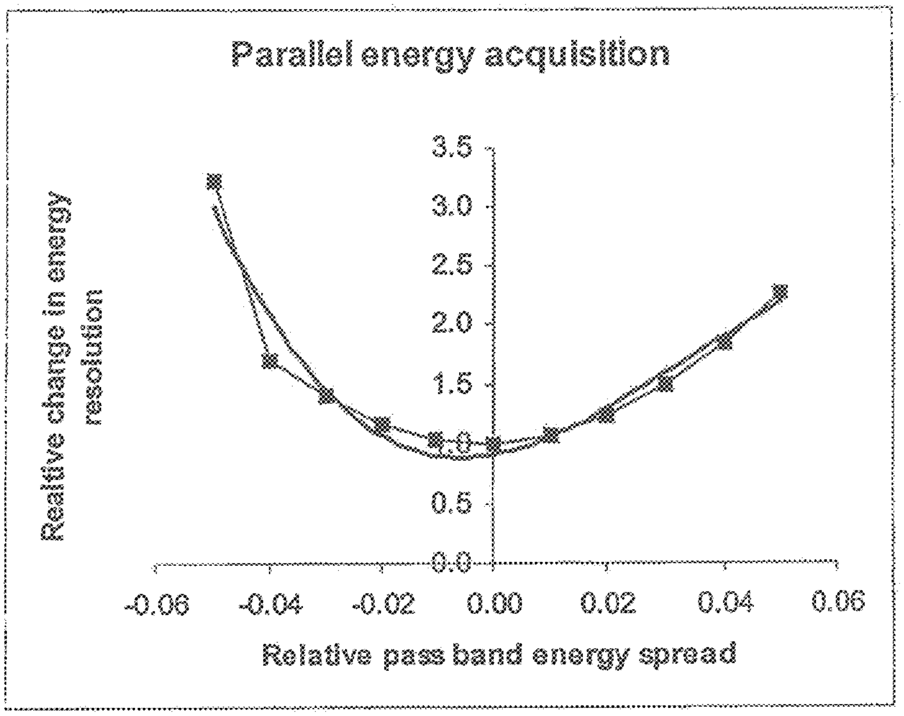
FIG. 7 shows simulated increases in energy resolution across the energy band spanning 95% to 105% of the pass energy.

In order to quantify the information depicted in FIGS. 6*a* and 6*b*, the rms value of the trace width at each energy along the detection plane 13 (at angle of 26.4° to the horizontal axis) was calculated, and normalized to its value at the centre of the band. This quantity is a direct measure of the relative rise of the energy resolution across the energy band, and is shown in FIG. 7. As expected, there is a relative increase in trace width as a function of how far the pass energy deviates from the central one, however, it rises relatively slowly, meaning that the second-order focusing region extends across a significant portion of the energy band: the trace width limited by spherical aberration rises by less than a factor of two for an energy pass band range defined approximately by 96% to 104% of the pass energy. Within this energy range, the focusing properties of parallel energy detection are still approximately of second-order.

Figure 8:
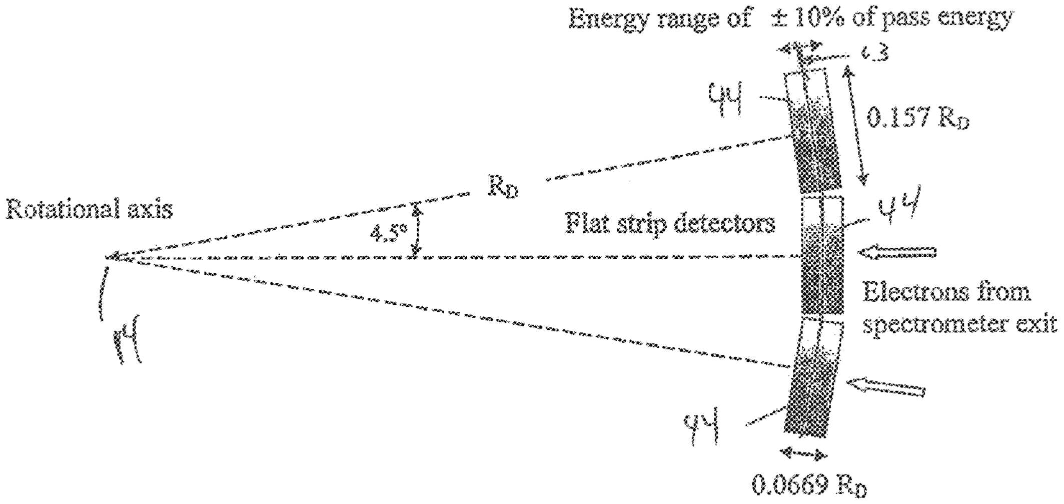
FIG. 8 shows part of the plan view of a flat strip multi-channel array in the angular azimuthal direction in which 40 strip detectors fit on to the conical detector plane of radius $R_D$, the 0.0669 $R_D$ apparent width corresponding to 0.0749 $R_D$ in the r-z plane, which captures an energy range of ±10% of pass energy.

One way to achieve parallel detection on the surface of a cone which has a slant of 26.4° may be to use an array of multi-channel flat strip detectors 44 that are evenly distributed in the angular azimuthal direction. FIG. 8 shows how a portion of this array would appear looking down on to the detection plane 13 for 40 flat strip detectors 44, each detector 44 capturing electrons over a 9° window in the azimuthal direction. The detector array is placed on the cone slant at the point of second-order focus 23. The radius (distance between plane 13 and rotational axis), $R_D$, at this point is relatively large, around 1.33 $R_1$. Due to the relatively shallow angle of the cone slant and its large radius, the size of each flat strip detector is relatively small in comparison to the detection cone surface: it has an extension in the azimuthal direction of approximately 0.157 $R_D$, and its length on the cone slant for a ±10% wide pass energy band is 0.0749 $R_D$, giving an apparent width of 0.0669 $R_D$ in the plan view. These dimensions are relatively small with respect to $R_D$, which means that the detector array provides a good approximation to the detection cone surface. If α is the semi-angle of collection for each detector, 4.5° in this case, it is straightforward to show from simple trigonometric considerations that the maximum positional error relative to $R_D$ due to the detector being flat is 1−cos(α), whose average value is given by, 1−sin(α/α). This translates to an average positional error of 1.03' $10^{-3}$ $R_D$, which when used as an off-set around the optimum position for second-order focusing only results in the spherical aberration trace width growing by 4.7%, giving an energy resolution of 0.152% on each flat strip detector 44, as opposed to the former value of 0.146% for perfect cone surface detection.

Figure 9:
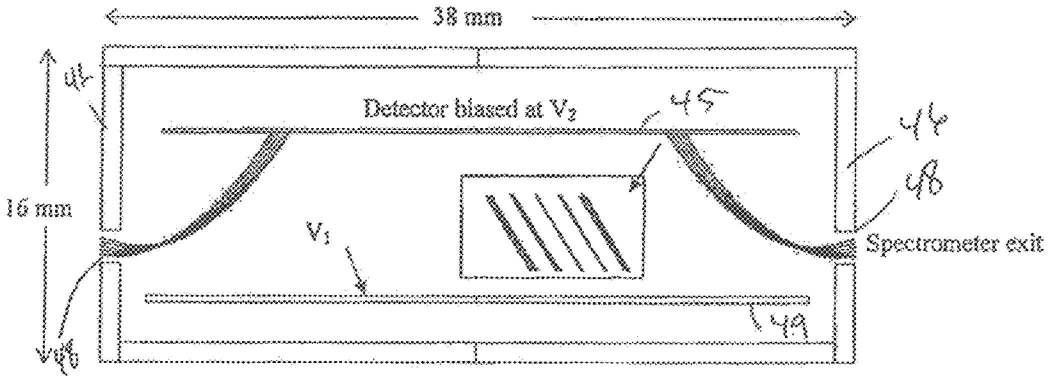
FIG. 9 shows simulated trajectory paths for a flat plane detection at a pass energy of 50 eV. There are 5 emission energies ranging from 95% to 105% of the pass energy in constant steps, and 11 input angles uniformly varying from −52 mrad to 52 mrad around the central ray (45°). $V_1$=−160 V, $V_2$=2500 V.

At relatively low pass energies (typically less than 50 eV), pass energies that are much lower than voltages required to bias the detector (say 1 to 2 kV), a flat plane detector design is possible. Referring to FIG. 9, electrons that pass through the spectrometer can be further deflected by an electric field created between a negative lower electrode 49, biased at $V_1$, and an upper flat plane detector 45 biased to $V_2$, typically biased to several kV, as shown by simulated trajectory paths in FIG. 9. In this example, electron trajectory paths were traced through the spectrometer for five emission energies: 47.5 to 52.5 eV in steps of 1.25 eV, that is, within the 95% to 105% range of a 50 eV pass energy. They enter the spectrometer with eleven angles uniformly distributed between −52 to +52 mrad (±3°), where $V_1$=−160 V, and $V_2$=+2.5 kV.

Figure 10:
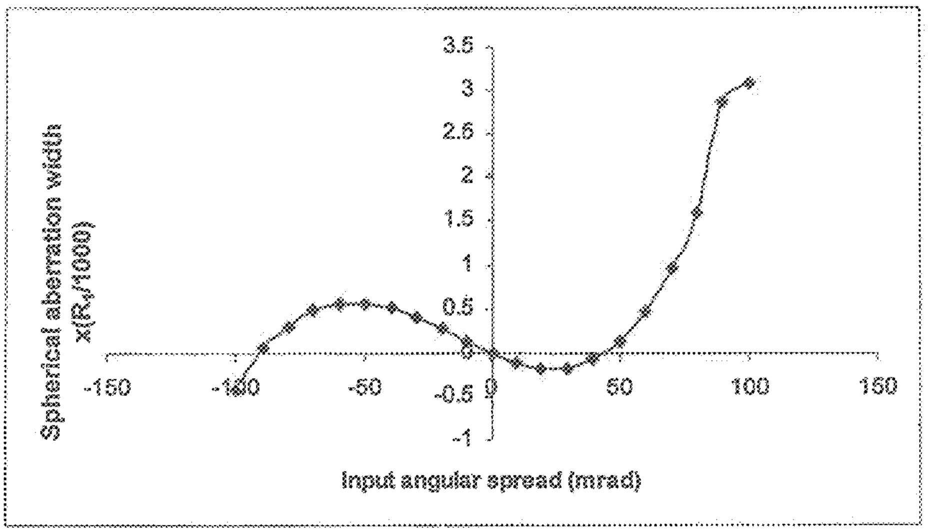
FIG. 10 shows a simulated normalized spherical aberration trace width at a flat detector plane.

FIG. 10 shows the predicted trace width due to spherical aberration at the flat plane detector surface. The predicted energy resolution on the flat plane detector is 0.196% for the centre of the pass band, and 0.769% for the outer energies (at 95% and 105% of the pass band energy). These resolution estimates take into account the asymmetric nature of the trace width distribution. Thus, instead of finding the energy resolution by doubling the total rms distribution for the whole input angular range, the rms trace width is calculated for the negative and positive parts of the input angular range separately, and then subsequently added together. Although the trace width due to angular dispersion on the flat detection plane is larger than its value on the conical detection plane, the dispersion is also correspondingly larger, leading to the prediction that the energy resolution on the flat plane detector will be only marginally worse than its value at the conical detection plane, 0.196% compared to 0.146% respectively. These simulation results indicate that at least for relatively low pass energies (<50 eV), the complications of detection on a conical surface may be avoided.

Figure 11A:
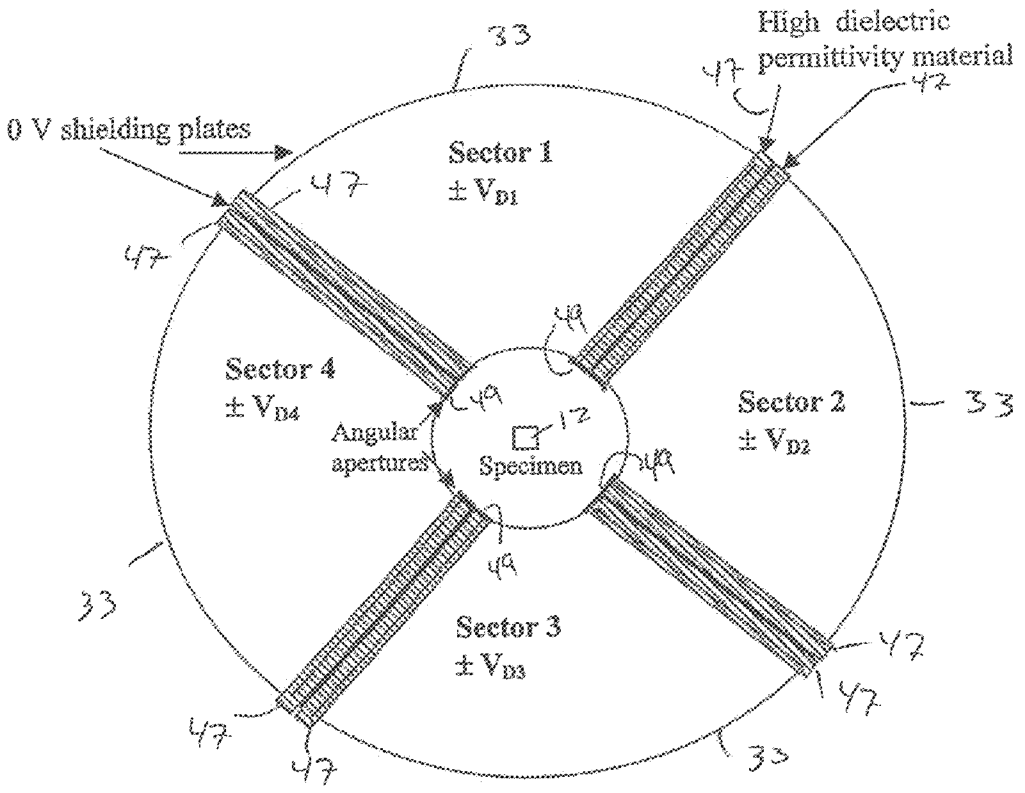
FIG. 11*a* shows a top plan view of a spectrometer design for parallel energy acquisition through the use of separate sectors in the azimuthal angular direction. $V_{D1}$ to $V_{D4}$ indicating deflection voltages for 4 sectors.
Figure 11B:
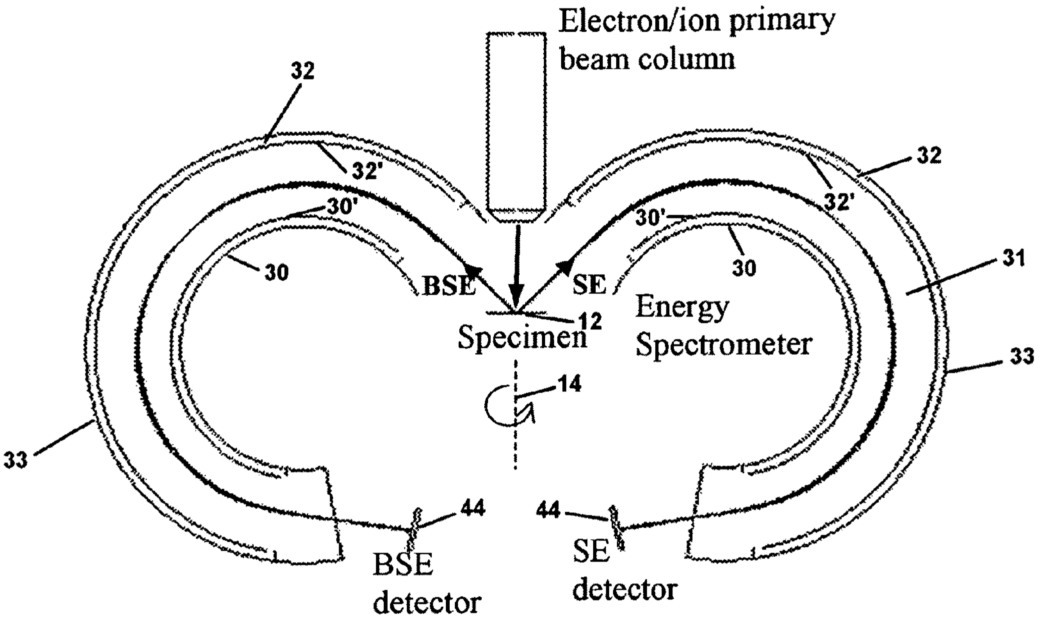
FIG. 11*b* illustrates an example of a multi-sector spectrometer design.

A spectrometer according to the second embodiment of the present invention is divided into an array of separate sectors in the azimuthal direction, as shown in FIG. 11*a*. Each sector in a spectrometer according to the second embodiment has its own pair of deflection plate voltages. That is, unlike the first embodiment in which the entire body of a semi-toroidal deflection plate is biased to a voltage (e.g. $V_1$ or $V_2$), in the second embodiment, first deflection plate 30 and second deflection plate 32 are divided into several sectors (e.g. four sectors as illustrated). Each sector includes a portion of the semi-teroidal spectrometer and is separated from an adjacently disposed sector by respective shielding plates 33 and a high dielectric permittivity material 47. The dielectric material 47 decouples electric fields within each sector from one another, and ensures that the electric field distribution is uniform in the azimuthal direction, avoiding undesirable sector edge-effects. Angular apertures 49 are necessary to prevent the scattered electrons from charging up dielectric material 47. The main advantage of dividing the toroidal spectrometer into an array of sectors in the azimuthal direction is that each sector can be separately set to detect/analyze electrons having a different pass energy, greatly enhancing the spectrometer's ability to acquire parallel energy information. A second-order focusing toroidal spectrometer can act both as a detector and energy spectrometer inside the specimen chamber of ion/electron of an SEM. Thus, in an SEM, one of the sectors might be used for the secondary electron part of the energy spectrum, while the others may be used to detect different ranges of the BSE spectrum as schematically illustrated by FIG. 11*b*.

In the parallel energy acquisition mode, where an array of sectors in the azimuthal angular direction form different energy channels, the toroidal spectrometer compares favorably with other parallel energy spectrometer designs proposed for Auger spectroscopy, such as the Hyperbolic Field Analyzer (HFA) or the parallel cylindrical mirror electron analyzer (PCMA). The HFA is typically set to capture the energy range of 75 to 2600 eV, having an energy resolution of 0.8% at 100 eV and 0.16% at 2,500 eV. However, its acceptance angles are relatively small, resulting in a transmittance of only 0.05%. The PCMA is designed to operate over a 300 to 1500 eV energy range, and has simulated energy resolutions of 0.876% at 300 eV and 0.3% at 1500 eV respectively. The PCMA has an expected transmittance of 0.922% (0.058 sr), which is higher than the HFA, since it is intrinsically rotationally symmetric. In the parallel mode of operation, the focusing properties of both the HFA and PCMA spectrometers are of first-order, but for a specific entry angle/energy, they can achieve second-order focusing. In comparison, a toroidal spectrometer according to the present invention always operates in a second-order focusing mode, and is predicted to have an energy resolution of less than 0.2% for ±6° acceptance angles (around 18% total transmittance if 2% is lost at sector edges). Unlike the HFA and PCMA, the toroidal spectrometer does not capture the complete spectrum range with a single multi-channel detector, but samples it with an array of multi-channel detectors, each operating with a parallel energy window of say ±5% of the pass energy (or more). The transmittance of each channel and coverage of the entire energy range depends on the number of energy channels used. For example, for 10 channels sampling the energy range from 300 to 1500 eV, the first channel width is 30 eV and the tenth channel width is 150 eV, while the transmittance of each channel is around 1.8% (total transmittance of 18% assumed). There, like the HFA and PCMA spectrometers, the parallel energy mode of operation for a toroidal spectrometer according to the present invention is expected to speed up data acquisition times by well over an order of magnitude compared to conventional single energy channel spectrometers.

The Incorporation of an Accelerating Pre-Focusing Lens

Figure 12:
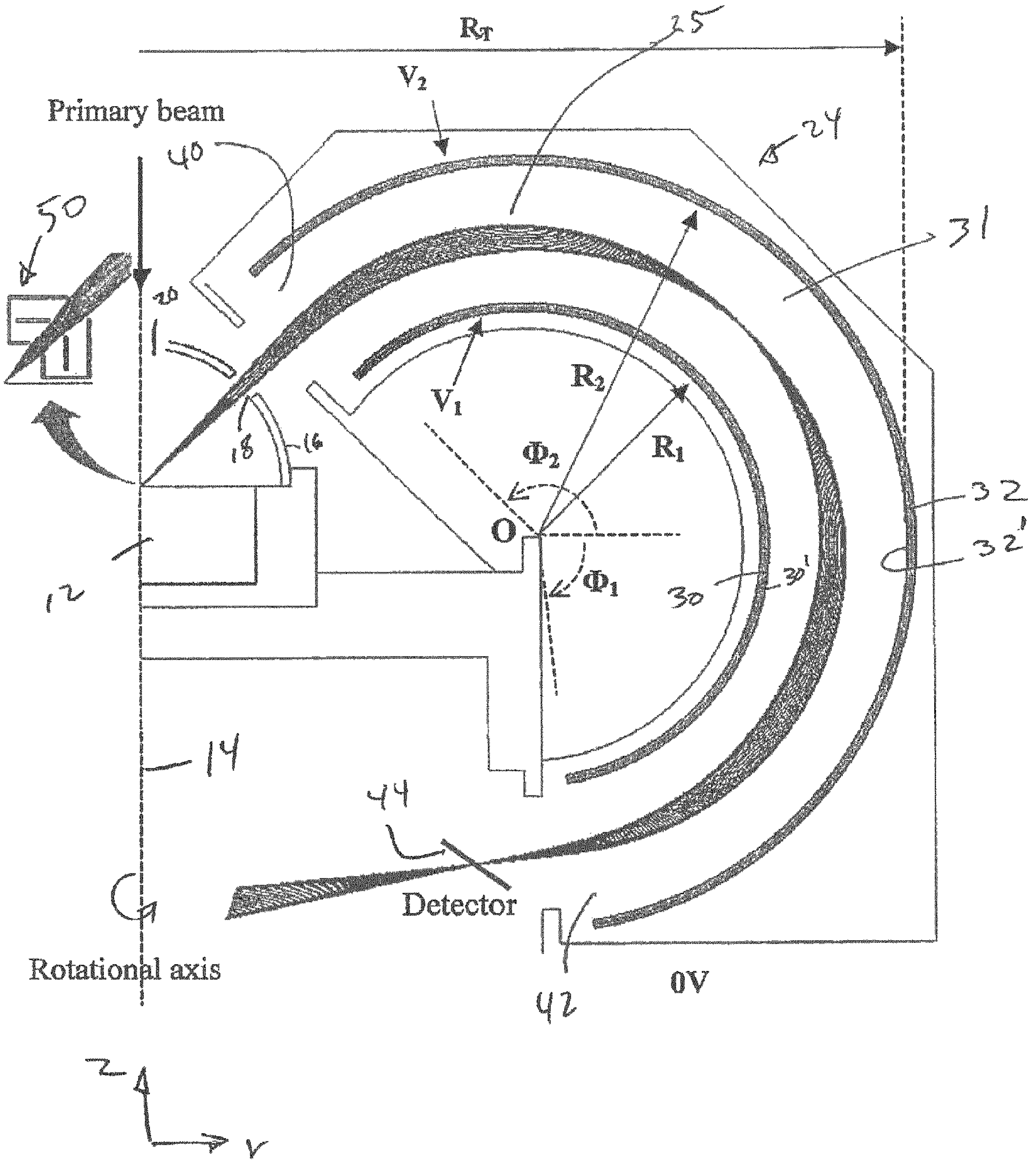
FIG. 12 shows simulated ray paths of electrons passing through a prefocusing lens and into a spectrometer according to the present invention at the pass energy for a wide variety of entrance angles. The central ray enters in at 45° and 21 trajectories are plot over uniform steps for an input angular spread varying from −173 mrad to +173 mrad (−10° to 10°).

FIG. 12 shows both a toroidal spectrometer 24 layout and simulated ray paths 25 through toroidal space 31 according to another embodiment of the present invention. The spectrometer design is characterized by five parameters. The polar coordinates $\phi_1$, $\phi_2$, $R_1$ and $R_2$ define the length and radii of the spectrometer deflection plates 30, 32 around the centre point O in the r-z plane, while $R_T$ defines the outer spectrometer radius (i.e. the distance between rotational axis 14 and concave surface 32'). First and second deflection plates 30, 32 are biased to $V_1$ and $V_2$. For the purpose of simulating the performance of the embodiment depicted by FIG. 12 the following parameters were used: $\phi_1=-\pi/2.25$, $\phi_2=3\pi/4$, $R_2=1.57R_1$, $R_T=2R_2$, deflection plate potentials normalized to $V_1=+1V$ and $V_2=-1V$. No value of $R_T$ is deliberately given here, since the spectrometer's optics does not depend on its absolute size. Thus, in practice, the spectrometer can be scaled up as required for different applications. Therefore, only relative dimensions are specified. With these conditions, the pass energy was found to be 2.293 eV.

In this embodiment, an accelerating pre-focusing lens 50 is placed near specimen 12 (between specimen 12 and electron entrance 40), in order to reduce angular spread 22 of the electrons/ions as they enter spectrometer 24. Simulated direct ray paths 25 for electrons/ions travelling through the spectrometer (incorporating a pre-focusing lens 50) are shown in FIG. 12. The lens electrodes are not directly visible in FIG. 12, since they are typically more than 100 times smaller than the outer dimensions of the spectrometer. In the simulation depicted by FIG. 12, 21 electrons/ions leave the specimen with an emission angular range between 35 to 55° (central ray traveling along a trajectory that is angularly spaced by an angle θ of 45°) emitted from specimen 12 at the spectrometer pass energy. In the first embodiment, simulated rays at an emission angular spread 22 of ±10° traveled very close to deflection plates 30, 32 inside curved space 31, producing large aberrations on the focal point at the detector plane. However, in this embodiment, the pre-focusing lens 50 collimates the electrons, whereby they are subsequently confined to the spectrometer central region (as shown in FIG. 12), thus improving the predicted energy resolution. In this improved design, for an entrance angular spread of ±10°, corresponding to transmission of around 34% for a given emission energy (assuming a cosine distribution in the polar angular direction), the optimum simulated energy resolution lies below 0.1%.

Figure 13:
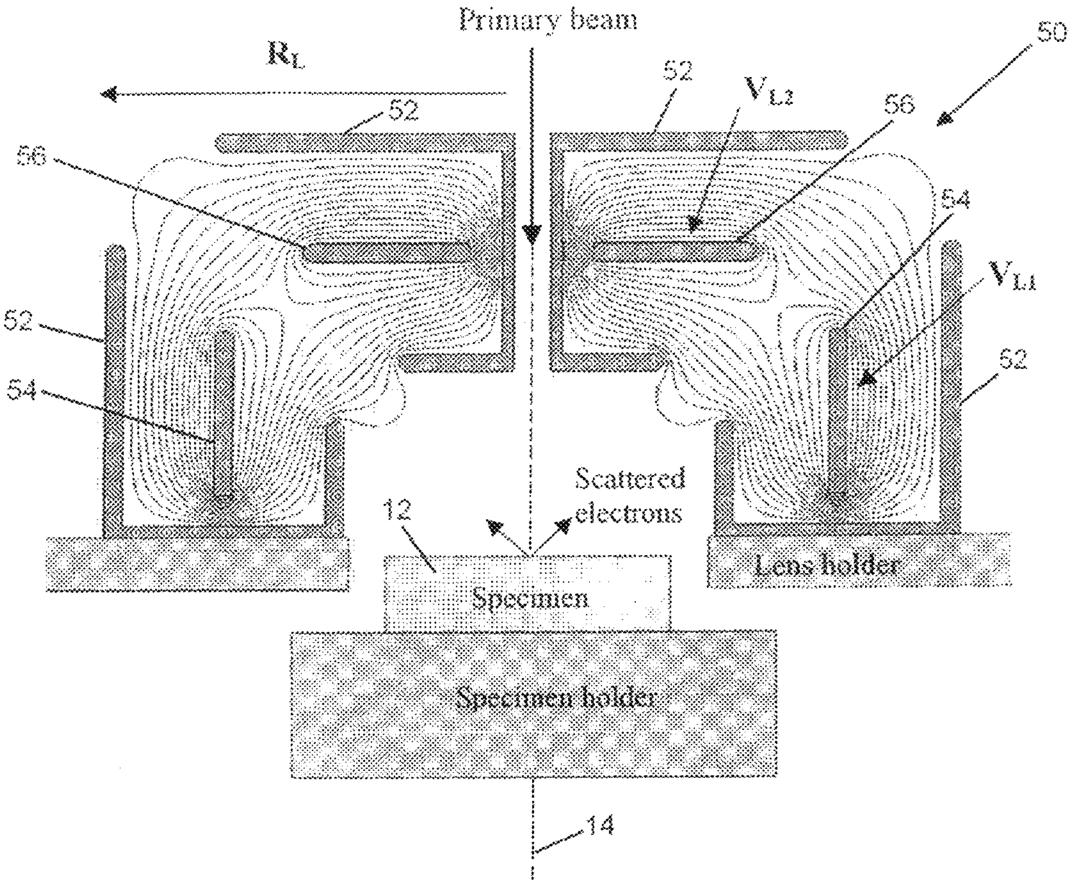
FIG. 13 shows equipotential lines from a numerically solved field distribution for the pre-focusing lens. 14 equipotential intervals are taken between 0V to 2.5V ($V_{L1}=V_{L2}$=2.5 V).

FIG. 13 shows the simulated electrostatic equipotential distribution for the pre-focusing lens 50. In the simulation, equipotential lines of uniform steps were used. Lens 50 is a three-element annular slit lens in which the outer electrodes 52 are grounded and the two middle electrodes 54, 56 are biased at the potentials $V_{L1}$ and $V_{L2}$. The lens radius is denoted by $R_L$. The lens bias voltages were chosen to be $V_{L1}=V_{L2}=E_P$, where $E_P$ is the pass energy of electrons. The lens dimensions were scaled down relative to the toroidal spectrometer in order to reduce lens spherical aberration effects, the ratio of $R_T/R_L=180$ was used. Depending on the required pass energy, the lens size (and therefore also the spectrometer size) may be scaled up in order to avoid electrical breakdown. In order to achieve the best energy resolution results, it was found that the lens central voltages $V_{L1}$ and $V_{L2}$ needed to be slightly different from one another.

Figure 14:
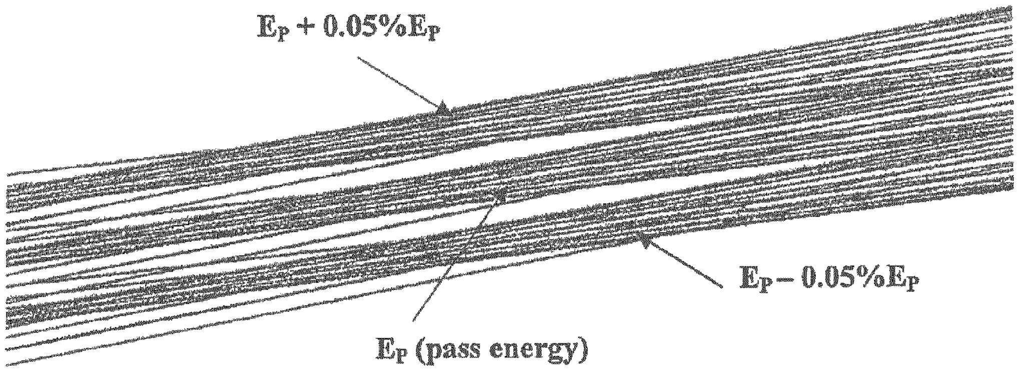
FIG. 14 shows simulated trajectories around the output focal plane for 3 emission $E_p$−0.05% $E_P$, $E_P$ and $E_P$+0.05% $E_P$, where $E_P$ is the pass energy, and the input angles range from −104 mrad to 104 mrad around the central ray in uniform steps.

The energy resolution of the spectrometer is related to the trace width created by spherical aberration, compared to energy dispersion along the detection plane. In the simulation, the energy resolution was estimated to be two times the rms value of the spherical aberration trace width distribution. This is certainly an underestimate of the resolution, since it translates to being around 70% of the full trace-width. In the past, the more usual practice was to take the energy resolution to be around 50% of the full trace-width. However, the rms approach has the merit of being dependent on information produced over the whole entrance angular range, rather than its two extreme values, and was therefore preferred. For input angles of ±6° (total angular spread of 12°), corresponding to a transmittance of 20% (assuming a polar angle cosine distribution), the best simulated relative energy resolution was found to be 0.021%, which is 7 times better than that of a second-order focusing toroidal spectrometer without the pre-focusing lens (0.146%). This energy resolution is achieved for the lens biased potentials of $V_{L1}=1.22E_P$ and $V_{L2}=1.15E_P$. For input angles of ±10° (angular spread of 20°), corresponding to the transmittance of 34%, the best relative energy resolution was simulated to be 0.088%. The simulated energy resolution improvement of the spectrometer by use of the pre-focusing lens 50 can be visually demonstrated by examining focal points at the detection plane, as shown in FIG. 14, in which three electron beams of different energies with an input angular spread of ±6° were plot. The difference in energy between these electron beams is 0.05% of the pass energy. It is clear that these three electron beams are well separated, visually confirming that the spectrometer design has a relative energy resolution well below 0.05%.

Figure 15A:
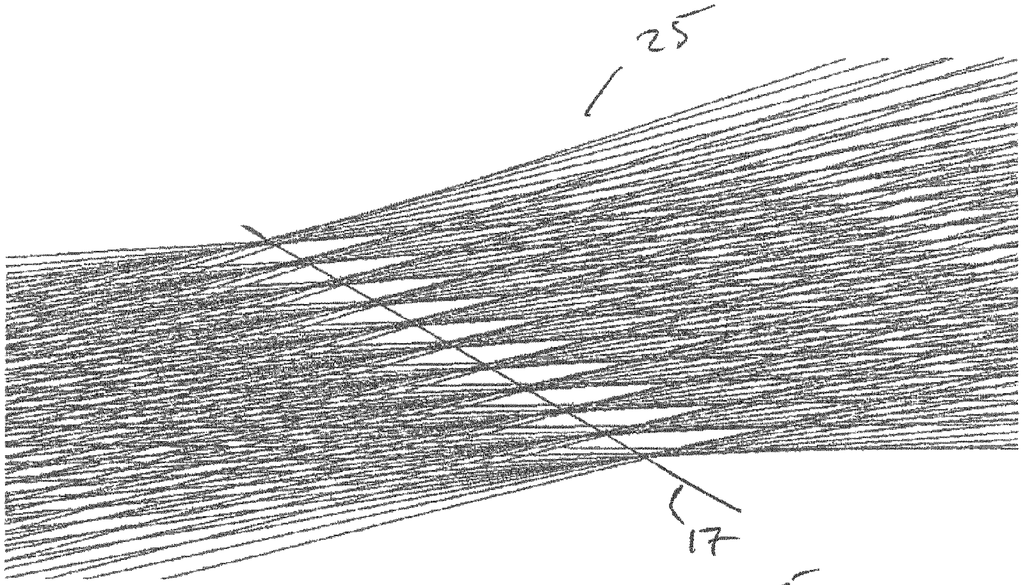
FIGS. 15*a* and 15*b* show simulated trajectories around the output focal plane for 11 emission energies ranging from 95% to 105% of the pass energy and 11 input angles from −104 mrad to 104 mrad around the central ray in uniform steps without the pre-focusing lens (FIG. 15*a*) and with the pre-focusing lens (FIG. 15*b*).
Figure 15B:
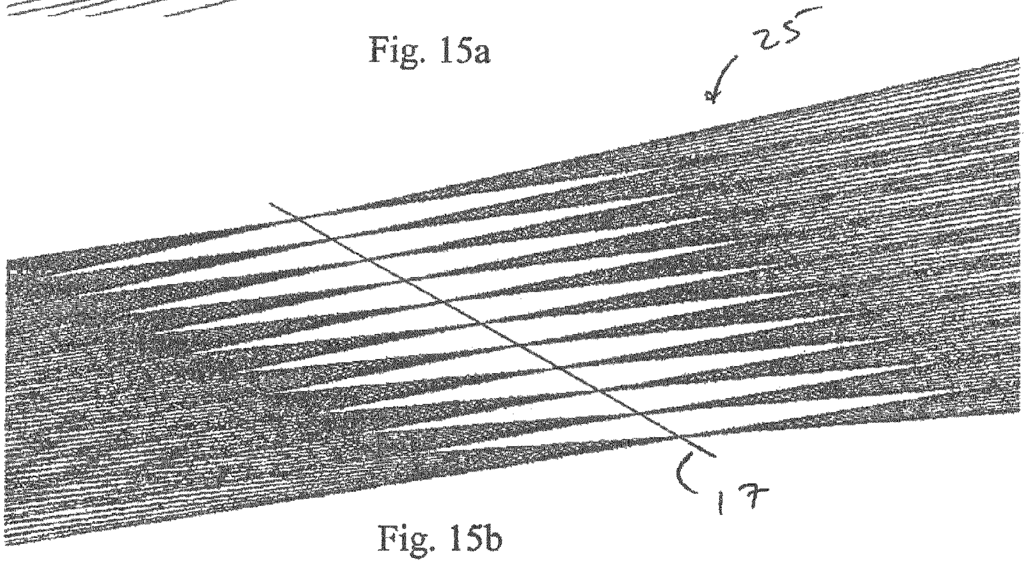

Simulation results predict that the addition of a pre-focusing lens 50 will also improve the parallel energy detection mode of operation. A comparison of ray paths around the detection plane with different energies and angles for the toroidal spectrometer with and without a pre-focusing lens 50 can be made by referring to the results shown by FIGS. 15(*a*) and 15(*b*). FIG. 15(*a*) shows trajectory ray paths 25 for the toroidal spectrometer only (without lens 50), while FIG. 15(*b*) shows trajectory ray paths 25 produced with the addition of a pre-focusing lens 50. In each figure, there are eleven different energies uniformly spread over an energy interval ranging from 95% to 105% of the pass energy (indicated by $E_p$ in the diagram). For each energy, there are eleven trajectories whose input angles are uniformly spread between −104 to 104 mrad (−6° to +6°) around the central entrance angle (45°). As is clear from FIGS. 15(*a*) and 15(*b*), the improvement of energy resolution is clearly maintained across the entire energy pass band range.

Figure 16A:
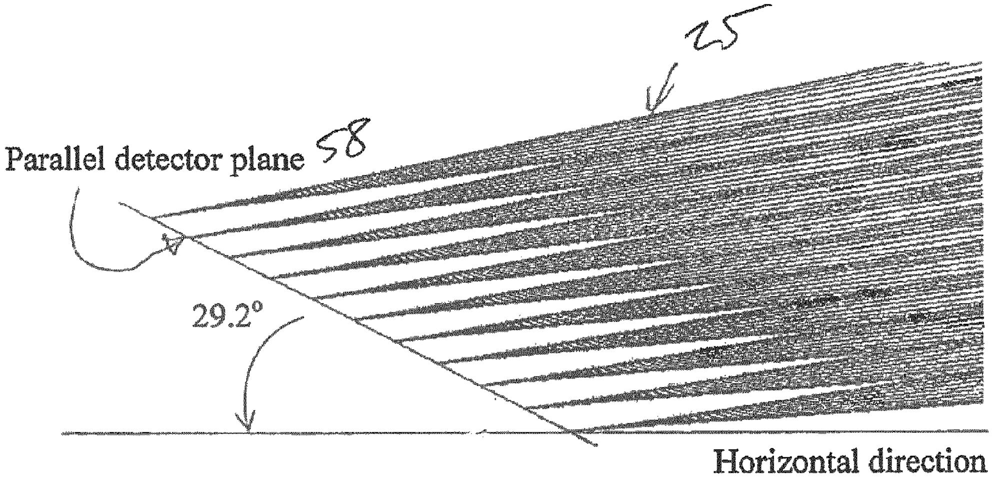
FIG. 16*a* shows simulated trajectories around the output focal plane for 11 emission energies ranging from 95% to 105% of the pass energy and 11 input angles ranging from −104 mrad to 104 mrad around the central ray in uniform steps along a detection plane at 29.2° with respect to horizontal direction.
Figure 16B:
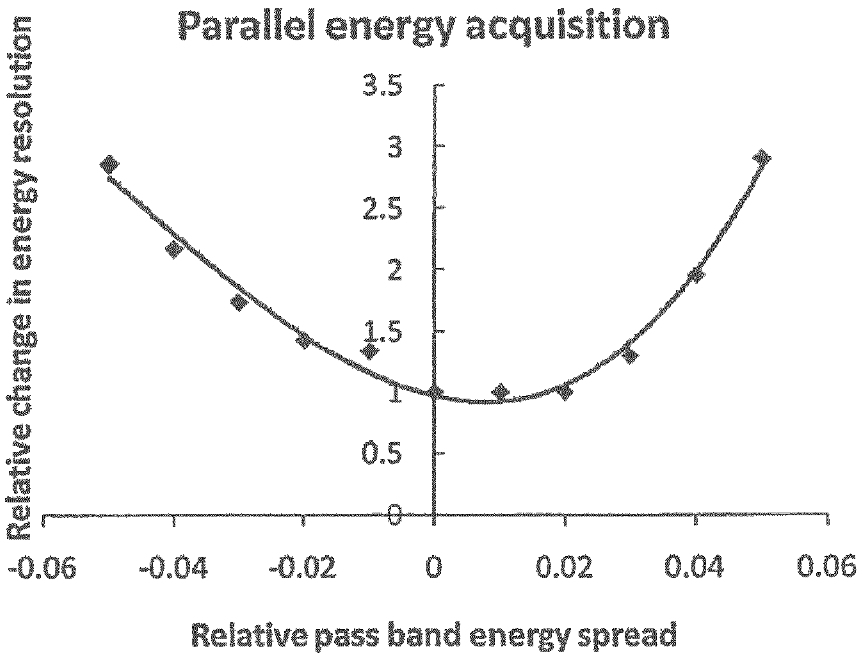
FIG. 16*b* shows simulated increase in energy resolution across the energy band spanning 95% to 105% of the pass energy.

FIG. 16*a* quantifies the information depicted by the ray paths shown in FIG. 15(*b*). FIG. 16(*a*) shows the case where the detector plane 58 is orientated to be 29.2° with respect to the horizontal axis, the optimum orientation angle of the detection plane. The rms value of the trace widths at each energy along detection plane 58 was calculated, and normalized to its value at the centre of the band. The results are shown in FIG. 16(*b*). FIG. 16(*b*) shows energy resolution rising by less than a factor of three for an energy pass band defined from 95% to 105% of the central pass energy. The results shown by FIG. 16(*b*) indicate that the degradation of the energy resolution is relatively small over a relatively wide energy range (~10%), making it possible to operate the spectrometer in the parallel energy mode of detection with high energy resolution. By way of comparison, the hemispherical spectrometer in retarding mode, has a bandwidth of only a few percent (the energy range over which its resolution rises by a factor of two to three).

For the second order focusing cylindrical mirror analyzer (CMA) commonly used in Auger spectroscopy, the best simulated relative energy resolution is around 0.155% for ±6 degrees entrance angles, therefore, the recent toroidal analyzer with a pre-focusing lens 50 is expected to be an order of magnitude better than the CMA for the same transmittance. Hemispherical spectrometers with retardation of the pass energy can provide an energy resolution of 0.05% but have much lower transmittance (<0.5%).

In summary, the simulation results predict that the spectrometer energy resolution-transmittance performance can be greatly improved by using a prefocusing lens, around an order of magnitude better than that of the second-order focusing CMA and a factor of 50 times better than previous first-order focusing toroidal spectrometers.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An electrostatic electron spectrometry apparatus, comprising:

a spectrometer that includes, a first deflection plate having a convex surface with a first radius of curvature;

a second deflection plate having a concave surface with a second radius of curvature larger than said first radius of curvature, said convex surface facing but spaced from said concave surface to define a curved space for passage of scattered electrons, said curved space having an electron entrance and an electron exit;

a first biasing source coupled to said first deflection plate to bias said first deflection plate to a first voltage; and a second biasing source coupled to said second deflection plate to bias said second deflection plate to a second voltage, said second voltage being different from said first voltage to generate electric field lines inside said curved space;

wherein said spectrometer is configured so that said scattered electrons enter said curved space through said electron entrance along any trajectory residing in a predefined angular spread, are focused once at a first point inside said curved spaced, and focused subsequently at a second point outside said electron exit.

2. The electrostatic electron spectrometry apparatus of claim 1, wherein said electron entrance is arranged to receive scattered electrons in a full azimuthal direction.

3. The electronic electron spectrometry apparatus of claim 1, wherein, when said first and said second deflection plates are biased to first and second voltages, scattered electrons are deflected radially on a plane that includes said first radius of curvature and said second radius of curvature.

4. The electrostatic electron spectrometry apparatus of claim 1, wherein said curved space is semi-toroidal.

5. The electrostatic electron spectrometry apparatus of claim 1, further comprising a plurality of herzog shunts at said electron entrance.

6. The electrostatic electron spectrometry apparatus of claim 1, further comprising a plurality of herzog shunts at said electron exit.

7. The electrostatic electron spectrometry apparatus of claim 1, further comprising a plurality of detectors arranged to intercept electrons exiting said electron exit.

8. The electrostatic electron spectrometry apparatus of claim 6, further comprising a filter disposed between said electron exit and said detector, said filter including an aperture to allow passage of electrons therethrough.

9. The electrostatic electron spectrometry apparatus of claim 1, wherein said angular spread can range between 12 degrees and 20 degrees.

10. The electrostatic electron spectrometry apparatus of claim 1, further comprising a pre-focusing lens disposed in the path of said scattered electrons before said electron entrance.

11. The electrostatic electron spectrometry apparatus of claim 1, wherein said spectrometer includes a plurality of sectors.

12. The electrostatic electron spectrometry apparatus of claim 1, further comprising a detector having a detection plane that intercepts electrons at said second point.

13. The electrostatic electron spectrometry apparatus of claim 1, wherein said scattered electrons are focused at a plurality of first points inside said curved space and subsequently focused at a plurality of respective second points outside said curved space, wherein a detector having a detection plane is positioned so that said detection plane intercepts said second points.

14. The electrostatic electron spectrometry apparatus of claim 1, further comprising an electron accelerator disposed before said electron entrance.

15. The electrostatic electron spectrometry apparatus of claim 1, further comprising an electron decelerator disposed before said electron entrance.

16. A method for spectrometry, comprising:

generating an electric field around a central point and extending along a curved path between an electron entrance region and an electron exit region, said electric field including a plurality of spaced, curved equipotential lines, each line having a respective radius of curvature passing through said central point along a common radial direction; and passing scattered electrons through said electron entrance and into said electric field to perform first order focusing before said electrons reach said electron exit region and second order focusing after said electrons reach said electron exit region.

17. The method of claim 16, further comprising selectively accelerating or decelerating said scattered electrons before said electrons reach said electron entrance region.

18. The method of claim 16, wherein said electric field is generated by biasing a first deflection plate to a first voltage and a second deflection plate to a second voltage, said first and said second deflection plates being spaced from one another to define said curved path.

19. The method of claim 16, wherein said scattered electrons travel along trajectory paths having an angular spread, said angular spread being defined by an aperture in a solid body that is disposed between said scattered electrons and said electron entrance.

20. The method of claim 16, wherein said angular spread is between 12 degrees and 20 degrees.

21. The method of claim 16, further comprising prefocusing said scattered electrons before said electrons pass through said electron entrance region.

* * * * *